(12) United States Patent
Agiwal et al.

(10) Patent No.: US 10,383,034 B2
(45) Date of Patent: Aug. 13, 2019

(54) METHOD AND APPARATUS FOR TRANSMITTING AND RECEIVING RESOURCE ALLOCATION INFORMATION IN A WIRELESS COMMUNICATION SYSTEM

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/910,216

(22) PCT Filed: Aug. 7, 2014

(86) PCT No.: PCT/KR2014/007310
§ 371 (c)(1),
(2) Date: Feb. 4, 2016

(87) PCT Pub. No.: WO2015/020448
PCT Pub. Date: Feb. 12, 2015

(65) Prior Publication Data
US 2016/0183167 A1 Jun. 23, 2016

(30) Foreign Application Priority Data

Aug. 7, 2013 (IN) .............................. 933/KOL/2013
Oct. 21, 2013 (IN) .............................. 1195/KOL/2013
(Continued)

(51) Int. Cl.
*H04W 4/00* (2018.01)
*H04W 48/08* (2009.01)
(Continued)

(52) U.S. Cl.
CPC ........... *H04W 48/08* (2013.01); *H04W 48/16* (2013.01); *H04W 72/042* (2013.01); *H04W 28/06* (2013.01)

(58) Field of Classification Search
CPC ..................................................... H04W 48/16
See application file for complete search history.

(56) References Cited

U.S. PATENT DOCUMENTS 9,544,890 B2 * 1/2017 Wu ........................ H04L 1/1867
9,554,393 B2 * 1/2017 Seo ..................... H04W 76/023
(Continued)

FOREIGN PATENT DOCUMENTS

CN 102547871 A 7/2012
CN 102857901 A 1/2013
(Continued)

OTHER PUBLICATIONS

Alcatel-Lucent et al., "Device Discovery for D2D Proximity Services", 3GPP TSG-RAN1 Meeting #72bis, R1-130954, Apr. 15-19, 2013, Chicago, USA.

*Primary Examiner* — Guang W Li
(74) *Attorney, Agent, or Firm* — JJefferson IP Law, LLP

(57) ABSTRACT

A method and an apparatus for transmitting and receiving resource allocation information in a wireless communication system are provided. The method includes allocating resources for each of one or more device-to-device (D2D) discovery resources pools, generating information related to resources allocated for each of the one or more D2D discovery resource pools, and transmitting the generated information.

18 Claims, 17 Drawing Sheets

(30) Foreign Application Priority Data

Jan. 22, 2014 (IN) .............................. 95/KOL/2014
Mar. 18, 2014 (IN) ............................ 340/KOL/2014

(51) Int. Cl.
*H04W 72/04* (2009.01)
*H04W 48/16* (2009.01)
*H04W 28/06* (2009.01)

(56) References Cited

U.S. PATENT DOCUMENTS

| | | | | |
|---|---|---|---|---|
| 9,838,181 | B2* | 12/2017 | Seo ........................ | H04L 5/0053 |
| 9,973,916 | B2* | 5/2018 | Niu ......................... | H04W 4/70 |
| 2005/0068990 | A1 | 5/2005 | Liu | |
| 2008/0084853 | A1 | 4/2008 | Kuchibhotla et al. | |
| 2010/0322229 | A1 | 12/2010 | Kim et al. | |
| 2011/0044261 | A1 | 2/2011 | Cai et al. | |
| 2011/0106952 | A1* | 5/2011 | Doppler ............. | H04W 72/0406 |
| | | | | 709/226 |
| 2013/0109301 | A1* | 5/2013 | Hakola ............... | H04W 76/023 |
| | | | | 455/39 |
| 2013/0148566 | A1 | 6/2013 | Doppler et al. | |
| 2013/0155962 | A1* | 6/2013 | Hakola ............... | H04W 72/042 |
| | | | | 370/329 |
| 2013/0188546 | A1* | 7/2013 | Turtinen ............... | H04W 8/005 |
| | | | | 370/312 |
| 2014/0112194 | A1* | 4/2014 | Novlan ................. | H04W 8/005 |
| | | | | 370/254 |
| 2014/0199999 | A1* | 7/2014 | Hakola ................. | H04W 8/005 |
| | | | | 455/435.1 |
| 2014/0241256 | A1* | 8/2014 | Jiang ................. | H04W 72/1215 |
| | | | | 370/329 |
| 2014/0328238 | A1 | 11/2014 | Seok et al. | |
| 2015/0004901 | A1 | 1/2015 | Agiwal et al. | |
| 2015/0223147 | A1* | 8/2015 | Fujishiro ............... | H04W 8/005 |
| | | | | 370/329 |
| 2015/0245192 | A1* | 8/2015 | Wu ........................ | H04W 8/005 |
| | | | | 370/329 |
| 2015/0264551 | A1* | 9/2015 | Ko ........................ | H04W 76/14 |
| | | | | 370/329 |
| 2015/0351003 | A1* | 12/2015 | Ahn ...................... | H04B 7/2656 |
| | | | | 455/434 |
| 2015/0365942 | A1* | 12/2015 | Niu .................... | H04W 72/0413 |
| | | | | 370/330 |
| 2015/0373628 | A1* | 12/2015 | Hwang ................. | H04W 48/16 |
| | | | | 370/338 |
| 2016/0095093 | A1* | 3/2016 | Yi .......................... | H04L 5/001 |
| | | | | 370/280 |
| 2016/0100401 | A1* | 4/2016 | Xiong .................. | H04B 7/0452 |
| | | | | 455/450 |
| 2016/0142898 | A1* | 5/2016 | Poitau ............... | H04W 72/0413 |
| | | | | 370/329 |
| 2016/0192426 | A1* | 6/2016 | Noh ...................... | H04W 76/14 |
| | | | | 370/329 |
| 2016/0338055 | A1* | 11/2016 | Yang ..................... | H04W 8/005 |

FOREIGN PATENT DOCUMENTS

| | | |
|---|---|---|
| JP | 2016-513423 A | 5/2016 |
| WO | 2013/077692 A1 | 5/2013 |
| WO | 2013-108219 A1 | 7/2013 |
| WO | 2014/032592 A1 | 3/2014 |
| WO | 2014/034286 A1 | 3/2014 |
| WO | 2014/133831 A1 | 9/2014 |

* cited by examiner

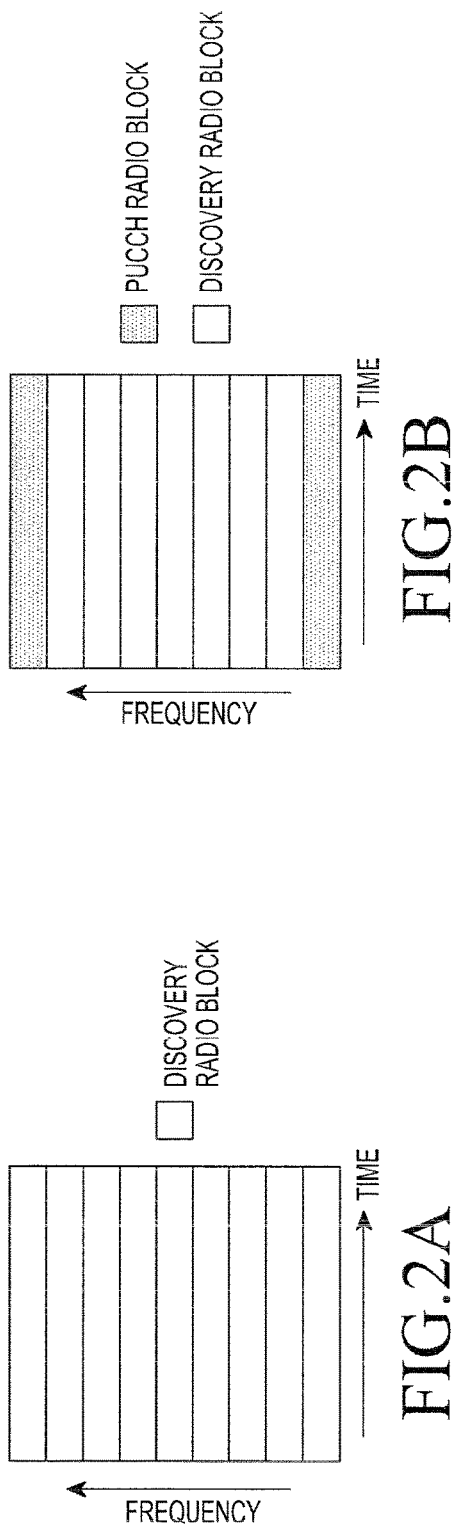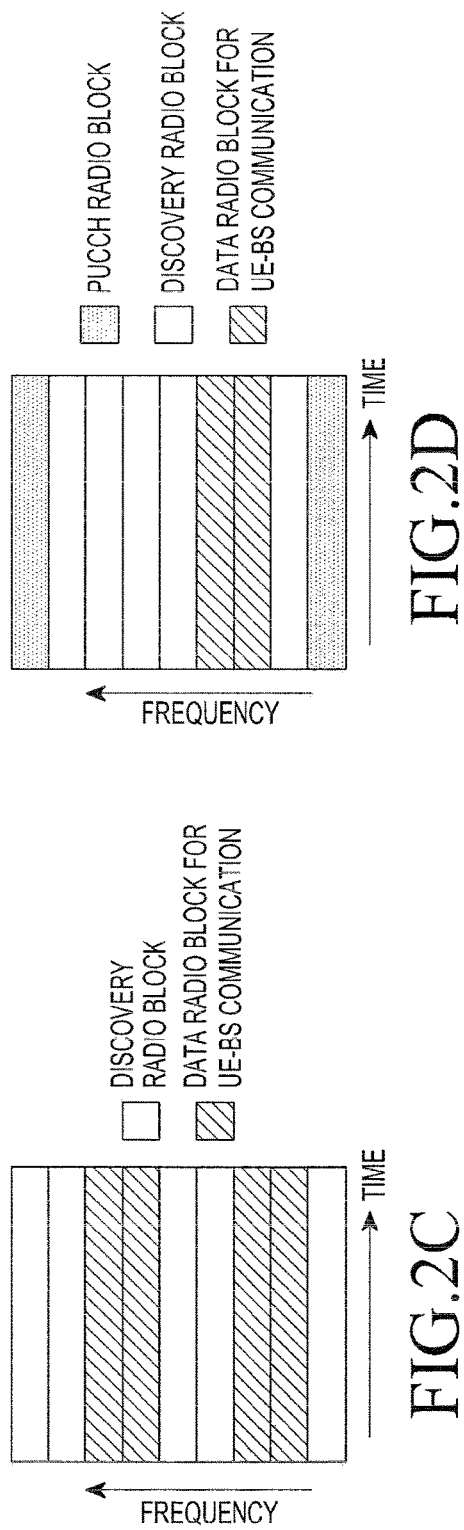

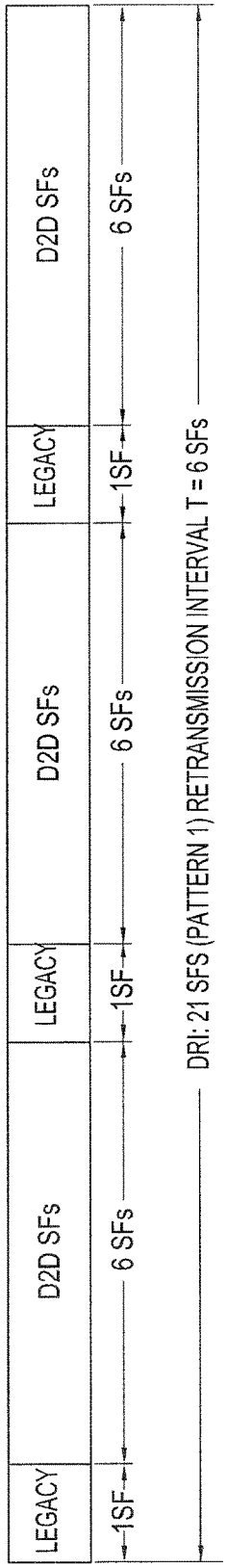
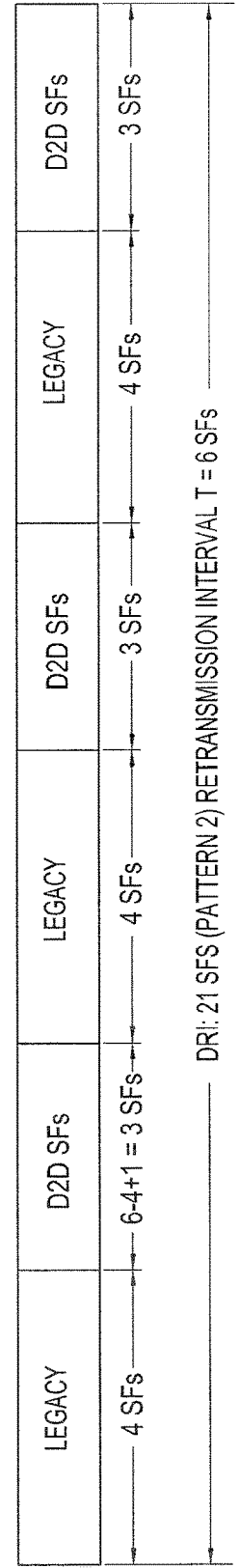
FIG.5A
FIG.5B

METHOD AND APPARATUS FOR TRANSMITTING AND RECEIVING RESOURCE ALLOCATION INFORMATION IN A WIRELESS COMMUNICATION SYSTEM

CROSS-REFERENCE TO RELATED APPLICATION(S)

This application is a U.S. National Stage application under 35 U.S.C. § 371 of an International application filed on Aug. 7, 2014 and assigned application number PCT/KR2014/007310, which claimed the benefit of an Indian patent application filed on Aug. 7, 2013 in the Indian patent Office and assigned Serial number 933/KOL/2013, of an Indian patent application filed on Oct. 21, 2013 in the Indian patent Office and assigned Serial number 1195/KOL/2013, of an Indian patent application filed on Jan. 22, 2014 in the Indian patent Office and assigned Serial number 95/KOL/2014, and of an Indian patent application filed on Mar. 18, 2014 in the Indian patent Office and assigned Serial number 340/KOL/2014, the entire disclosure of each of which is hereby incorporated by reference.

TECHNICAL FIELD

The present disclosure relates to a method and apparatus for transmitting and receiving resource allocation information in a wireless communication system.

BACKGROUND

Device-to-Device (D2D) discovery is a process of determining whether a user equipment (UE) that is capable of D2D communication (hereinafter, referred to as D2D-enabled UE) is in proximity of another D2D-enabled UE. Discovery of a D2D-enabled UE comprises determining whether another D2D-enabled UE is of interest to it using D2D discovery. A D2D-enabled UE is of interest to a discovering D2D-enabled UE if its proximity needs to be known by one or more authorized applications in the discovering D2D-enabled UE.

For example, a social networking application may be enabled to use D2D discovery features. The D2D discovery enables the D2D-enabled UE of a given user of a social networking application to discover and be discoverable by the D2D-enabled UEs of his/her friends. In another example, the D2D discovery may enable the D2D-enabled UE of a given user of a search application to discover stores or restaurants of interest in its proximity.

A D2D-enabled UE may discover other D2D-enabled UEs in its proximity by using direct UE-to-UE signaling with evolved universal terrestrial radio access (E-UTRA) technology. This is referred as D2D direct discovery. Alternatively, a communication network determines the proximity of two D2D-enabled UEs and informs them of their proximity. This is referred as network-assisted D2D discovery.

It is assumed that the same spectrum or radio frequency is used for D2D discovery and regular communication between a UE and a base station (BS). In traditional communication, a UE and a BS communicate with each other by establishing a connection with each other and the BS allocates dedicated resources to the UE.

In the case of D2D discovery, the requirements are quite different. There is no one-to-one communication between a D2D-enabled UE transmitting discovery information and another D2D-enabled UE receiving the discovery information during D2D direct Discovery. The discovery information transmitted by the D2D-enabled UE may be received and processed by multiple D2D-enabled UEs. D2D discovery is a continuous process performed by the D2D-enabled UEs. The D2D-enabled UEs should be able to perform D2D discovery irrespective of their states (that is, idle or connected). During the D2D direct discovery, the D2D-enabled UE monitoring the discovery information should know time and frequency resources used by the D2D-enabled UE transmitting the discovery information. The D2D discovery should coexist with legacy UE-BS communication. The time and frequency resources configured for discovery should minimize impact on legacy UEs. For example, latency-sensitive applications of legacy UEs should not be affected. That is, a synchronous hybrid automatic repeat request (HARQ) operation on an uplink (UL) should not be affected.

Accordingly, there is a need for a method for configuring and signaling resources for D2D discovery.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide a method and apparatus for transmitting and receiving resource allocation information in a wireless communication system.

Another aspect of the present disclosure is to provide a method and apparatus for configuring and signaling resources for device-to-device (D2D) discovery.

Another aspect of the present disclosure is to provide a method and apparatus for enabling D2D discovery without affecting communication of legacy user equipments (UEs) and an uplink (UL) hybrid automatic repeat request (HARQ) operation.

In accordance with an aspect of the present disclosure, a method of a base station (BS) in a communication system, the method comprising: generating information related to resources for discovery, the information includes subframe bitmap information; and transmitting the information. In accordance with another aspect of the present disclosure, a method of a user equipment (UE) in a communication system, the method comprising: receiving information related to resources for discovery, the information includes subframe bitmap information; and performing discovery based on the information.

In accordance with another aspect of the present disclosure, a base station (BS) in a communication system, the BS comprising: at least one processor configured to generate information related to resources for discovery, the information includes subframe bitmap information, and a transceiver configured to transmit the information.

In accordance with another aspect of the present disclosure, a user equipment (UE) in a communication system, the UE comprising: a transceiver configured to receive information related to resources for discovery, the information includes subframe bitmap information, and at least one processor configured to perform discovery based on the information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A-2D illustrate radio resource configurations for a subframe for direct discovery according to various embodiments of the present disclosure;

FIGS. 5A and 5B illustrate usages of subframe patterns in a DRI according to various embodiments of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be noted that the concepts of device-to-device (D2D) discovery according to the present disclosure are applicable to any type of D2D communication (discovery signal transmission and reception or data transmission and reception).

Discovery Resource Configuration

In an embodiment of the present disclosure, radio resources for direct discovery are allocated or reserved periodically. For this purpose, discovery resources are configured as illustrated in FIG. 1 according to an embodiment of the present disclosure.

Figure 1:
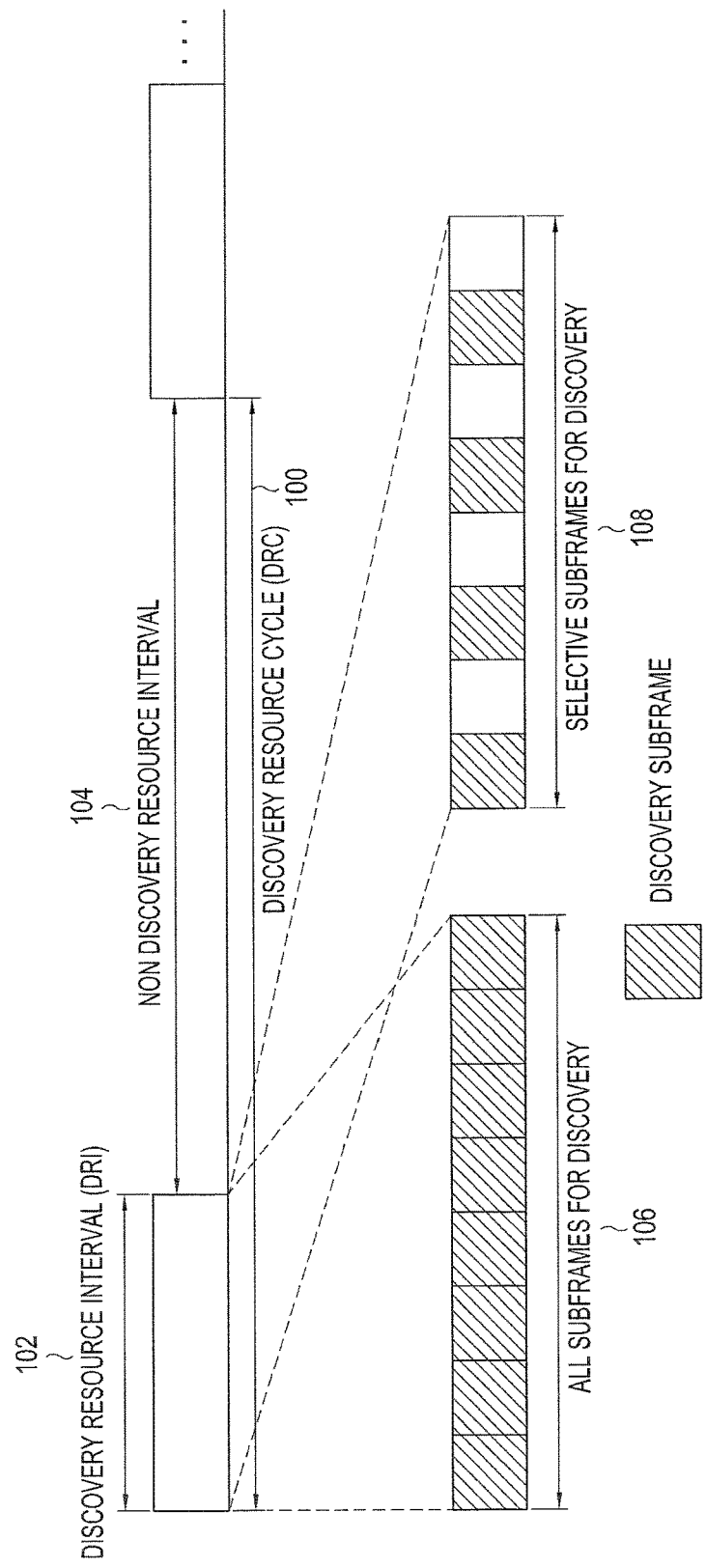
FIG. 1 illustrates a discovery resource configuration according to an embodiment of the present disclosure.

FIG. 1 illustrates a discovery resource configuration according to an embodiment of the present disclosure.

Referring to FIG. 1, the periodicity of reserving or allocating discovery resources may be indicated by a discovery resource cycle (DRC) 100. The DRC 100 includes a discovery resource interval (DRI) 102 and a non-discovery resource interval 104. Discovery resources are allocated or reserved for a duration indicated by the DRI 102 in every DRC 100. The DRC 100 and the DRI 102 are common for all D2D-enabled user equipments (UEs). In an embodiment, the DRC 100 and/or the DRI 102 are common for a group of D2D-enabled UEs.

In an embodiment, all subframes 106 of the DRI 102 may be allocated or reserved for direct discovery. In an embodiment, a subframe comprises a time slot of 1 ms duration. In another method, selective subframes 108 of the subframes of the DRI 102 may be allocated or reserved for direct discovery. Reservation or allocation of several consecutive subframes for direct discovery may affect latency-sensitive traffic for legacy UEs.

FIGS. 2A-2D illustrate radio resource configurations for a subframe for direct discovery according to various embodiments of the present disclosure.

Radio resources of a subframe for direct discovery may be configured and used in various manners according to various embodiments of the present disclosure. For example, all resources (for example, radio blocks (RBs)) of a subframe indicated for direct discovery may be used for direct discovery as illustrated in FIG. 2A.

In another example, resources except physical uplink common control channel (PUCCH) resources of a subframe indicated for direct discovery may be used for direct discovery as illustrated in FIG. 23B. Alternatively, resources except PUCCH and physical random access channel (PRACH) resources of a subframe indicated for direct discovery may be used for direct discovery.

In another example, discovery subframe resources (other than PUCCH resources and/or PRACH resources) may also be shared with legacy UE communication, as illustrated in FIGS. 2C and 2D. The legacy UE communication refers to communication between a UE and a BS. In this case, a discovery resource configuration indicates not only subframe(s) for discovery in a DRC but also indicates which resources (i.e. RBs) in each of the indicated discovery subframe(s) are meant for discovery, or indicates which resources in each of the indicated discovery subframe(s) are not meant for discovery.

Guard Band Between Discovery Resources and Resources for Communication Between UE and BS If a subframe includes discovery resources as well as resources for UE-BS communication, transmissions from a D2D-enabled UE in the discovery resources may affect or interfere with transmissions in the resources for UE-BS communication. Even if the discovery resources and the resources for UE-BS communication are different, the transmissions of the D2D-enabled UE may not be power-controlled, thus causing spurious emissions. In this context, a guard band is defined between D2D discovery resources and resources for UE-BS communication in an embodiment of the present disclosure.

Figure 3A:
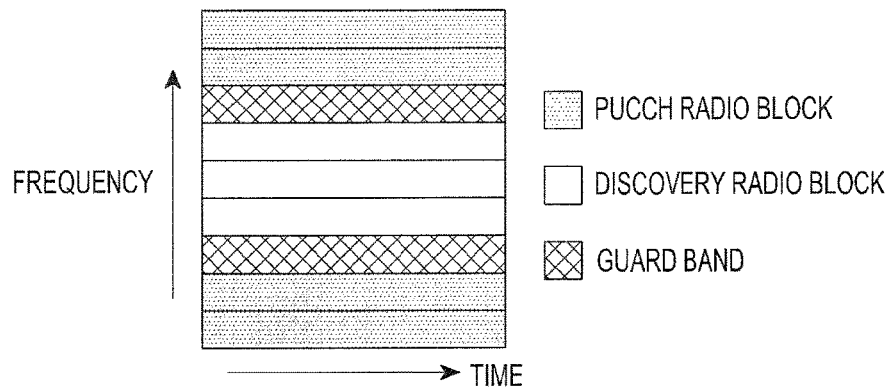
FIGS. 3A and 3B illustrate guard bands between resources for device-to-device (D2D) discovery and resources for communication between a base station (BS) and a user equipment (UE) according to various embodiments of the present disclosure.
Figure 3B:
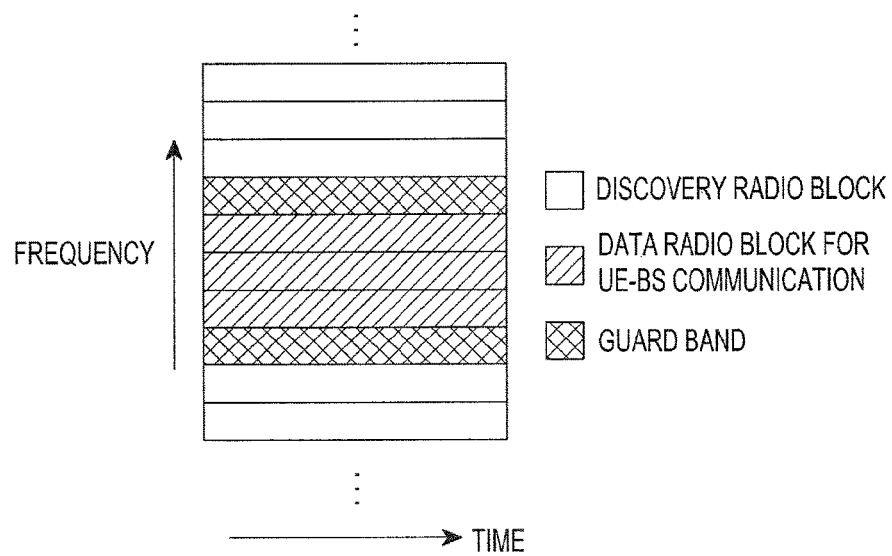

FIGS. 3A and 3B illustrate guard bands between resources for (D2D) discovery and resources for UE-BS communication according to various embodiments of the present disclosure.

According to an embodiment of the present disclosure, a guard band may be disposed between PUCCH resources and discovery resources adjacent to the PUCCH resources, as illustrated in FIG. 3A. The size of the guard band (for example, the number of RBs) may be fixed or determined by the network.

A D2D-enabled UE determines the PUCCH resources (that is, RBs) using a PUCCH resource configuration signaled in a system information (SI) message by a BS and skips the discovery resources corresponding to the guard band adjacent to the PUCCH resources. The D2D-enabled UE may not use the discovery resources corresponding to the guard band in transmitting discovery information.

Meanwhile, the resources corresponding to the guard band may not be indicated as discovery resources in a discovery resource configuration by the BS. This guard band may also be defined between resources for UE-BS communication and discovery resources, as illustrated in FIG. 3B.

Selective Discovery Subframe Pattern

If all subframes of a DRI are not allocated for discovery, a subframe pattern is needed for the DRI.

FIGS. 4A-4E illustrate subframe patterns for a DRI according to various embodiment of the present disclosure. For example, four subframe patterns are illustrated in FIGS. 4A-4E and subframes may be configured in the DRI in one of the four subframe patterns.

Figure 4A:
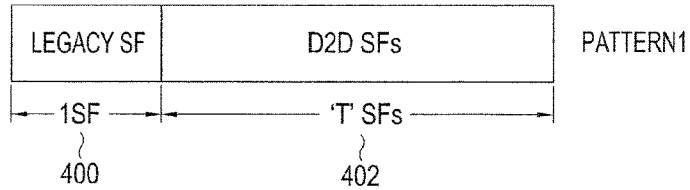
FIGS. 4A-4E illustrate subframe patterns for a discovery resource interval (DRI) according to various embodiments of the present disclosure.

In pattern 1, as illustrated in FIG. 4A, one subframe (SF) 400 for legacy communication is followed by 'T' subframes 402 for discovery. Herein, 'T' is a retransmission interval between hybrid automatic repeat request (HARQ) packets. It is to be noted that the legacy SF refers to an SF which is used for UE-BS communication. A retransmission interval 408 is illustrated in FIG. 4C.

Figure 4B:
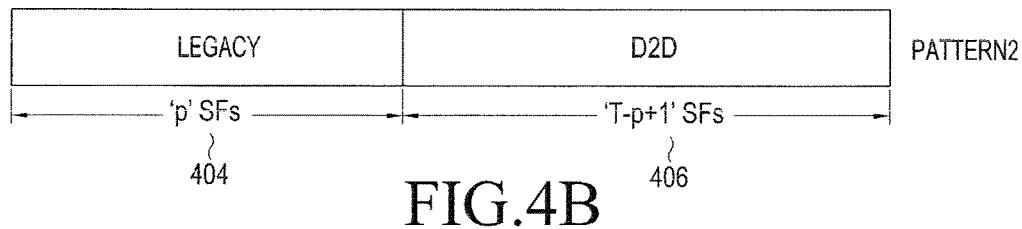
Figure 4C:
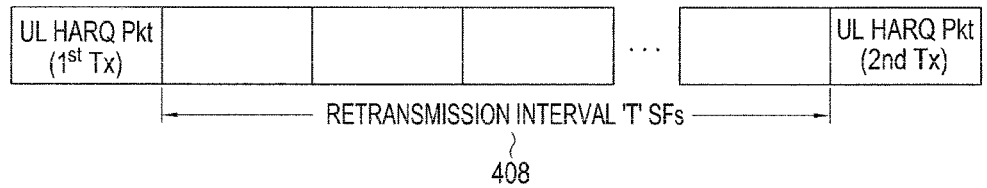

In pattern 2, as illustrated in FIG. 4B, 'p' SFs 404 for legacy communication are followed by 'T−p+1' SFs 406 for discovery. Herein, 'T' is a retransmission interval between HARQ packets and 'p' is an integer greater than zero. Pattern 1 may be regarded as a special case of pattern 2. If 'p' is set to 1, pattern 2 becomes pattern 1.

Figure 4D:
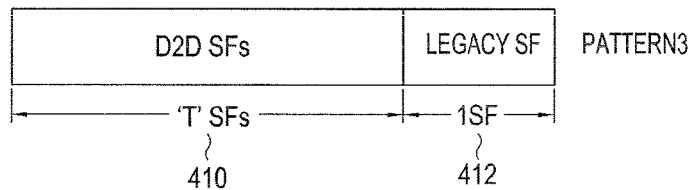
Figure 4E:
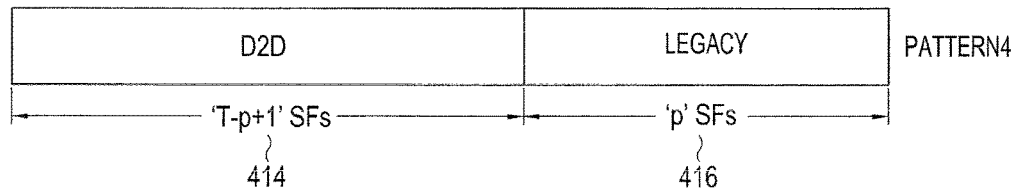

Referring to FIGS. 4D and 4E, pattern 3 and pattern 4 are the same as pattern 1 and pattern 2 except that 'T' SFs 410 and 'T−p+1' SFs 414 for discovery are followed by an SF 412 and 'p' SFs 416 for legacy communication in pattern 3 and pattern 4, respectively.

SFs for legacy communication and SFs for D2D discovery may be easily identified in a DRI by knowing a pattern type (for example, pattern 2 or pattern 4) and parameters 'T' and 'p'. In an embodiment, the value of 'p' may be dynamically changed based on discovery load and legacy UE load. It is to be noted that legacy UE load refers to the load of UE-BS communication. The subframe pattern type (for example, pattern 1 and pattern 2 or pattern 3 and pattern 4) may be configured in a static, semi-static, or dynamic manner.

FIGS. 5A and 5B illustrate usages of patterns in a DRI according to various embodiment of the present disclosure.

FIG. 5A illustrates a case in which pattern 1 is used in a DRI and FIG. 5B illustrates a case in which pattern 2 is used in a DRI. A retransmission interval of 6 SFs is used in these examples of FIGS. 5A and 5B.

Figure 6A:
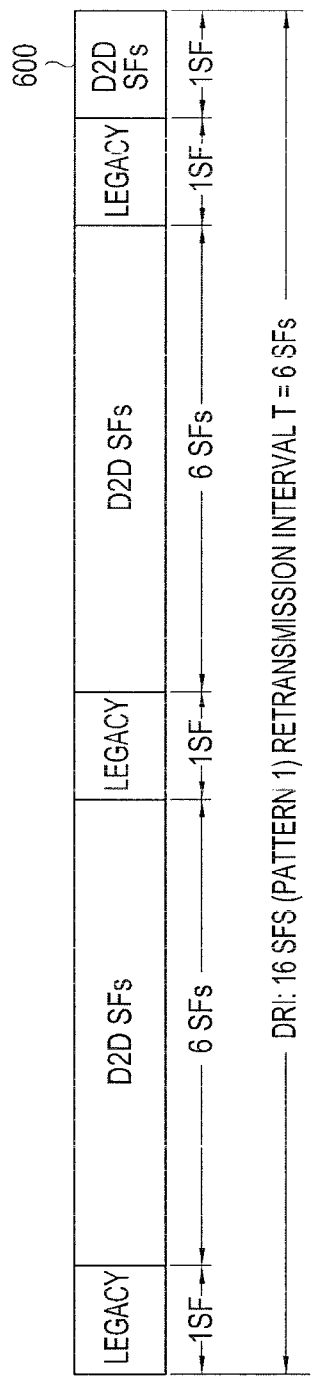
FIGS. 6A and 6B illustrate partial usages of subframe patterns in a DRI due to a DRI size according to various embodiments of the present disclosure.
Figure 6B:
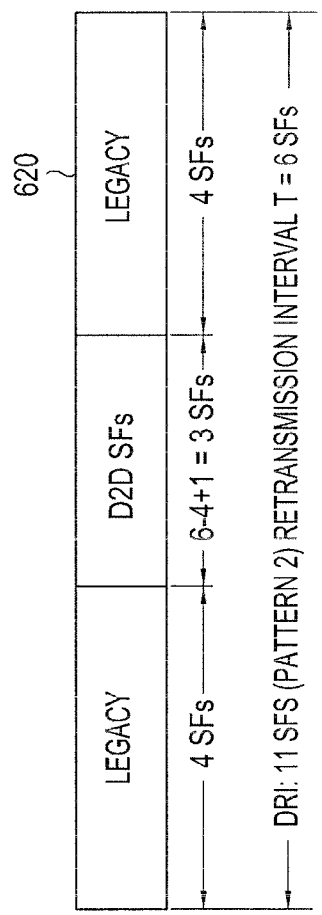

FIGS. 6A and 6B illustrate examples in which partial SF patterns are used in a DRI because of the size of the DRI according to various embodiment of the present disclosure.

The DRI size is not a multiple of the number of SFs in each pattern. In FIG. 6A, pattern 1 is repeated twice and a third repetition contains only partial D2D SFs 600. Referring to FIG. 6B, pattern 2 is repeated once and a second repetition contains only legacy SFs 620.

The patterns described above may be signaled as follows.

a) A parameter 'NumNonDiscoverySF' indicates non-discovery subframes in first 'N' subframes at the beginning of a DRC or spaced from the beginning of the DRC by a specific offset. The parameter 'NumNonDiscoverySF' may indicate an absolute number of subframes. Among 'N' subframes, NumNonDiscoverySF may indicate the number of consecutive non-discovery subframes at the beginning of the 'N' subframes or at the end of the 'N' subframes. The value of N may be equal to an HARQ retransmission interval or an HARQ round trip time (RTT) or any other value configurable by a network. In one example, the value of N may be 8. In another example, the value of N may be 10 subframes (that is, one radio frame). The value of N can be different for a time division duplex (TDD) and frequency division duplex (FDD) system. In an embodiment, subframes periodically occurring at an HARQ retransmission interval or an HARQ RTT from each of the indicated non-discovery subframes may be non-discovery subframes in the DRI. In another method, the pattern of discovery and non-discovery subframe signaled for first 'N' subframes (using parameter 'NumNonDiscoverySF' explained above) is repeated until the end of DRI if DRI duration is signaled explicitly. Alternately, the pattern of discovery and non-discovery subframe signaled for first 'N' subframes (using parameter "NumNonDiscoverySF" explained above) is repeated 'NumRepetition' times wherein 'NumRepetition' is indicated in resource configuration signaling. In this case, DRI is equal to 'N*NumRepetition' and is not explicitly signaled.

b) Alternatively, 'NumNonDiscoverySF' may be a bitmap of size N bits, in which each bit corresponds to a subframe/frame and indicates whether that subframe/frame is a discovery subframe/frame. In an embodiment, the most significant bit of the bitmap corresponds to a first subframe/frame in the DRC and the least significant bit of the bitmap corresponds to an Nth subframe/frame in the DRC. In another method, the least significant bit of the bitmap corresponds to a first subframe/frame in the DRC and the most significant bit of the bitmap corresponds to an Nth subframe/frame in the DRC. The value of N is equal to an HARQ retransmission interval, an HARQ RTT, a DRI, or any other value configurable by a network. The value of N can be different for a TDD and FDD system. In one example, the bitmap may be 8 or 10 bits or other multiples of 8 or 10. In an embodiment, subframes periodically occurring at an HARQ retransmission interval or an HARQ RTT from each of the indicated non-discovery subframes may be non-discovery subframes in the DRI. In another method, the pattern of discovery and non-discovery subframe signaled for first 'N' subframes using bitmap ('NumNonDiscoverySF') is repeated until the end of DRI if DRI duration is signaled explicitly. Alternately, the pattern of discovery and non-discovery subframe signaled for first 'N' subframes is repeated 'NumRepetition' times wherein 'NumRepetition' is indicated in resource configuration signaling. In this case DRI is equal to 'N*NumRepetition' and is not explicitly signaled. Alternately, the pattern of discovery and non-discovery subframe signaled for first 'N' subframes is not repeated. In this case, DRI is equal to 'N'. A set of sizes of N can be defined. For example, the set of sizes of N may be {144, 168}. The bitmap comprising discovery resource configuration will be one of the sizes in the set. For FDD, the bitmap refers to the contiguous set of sub-frames starting from the first subframe in DRC. For TDD, the bitmap refers to the contiguous set of sub-frames starting from the first subframe in DRC. Alternately, for TDD, the bitmap refers to all sub-frames of a radio frame except sub-frames 0, 1, 5 and 6. Note that each radio frame has 10 subframes numbered from 0 to 9.

Determining Start of DRC

In an embodiment of the present disclosure, a start of a DRC may be determined to be a system frame number (SFN) which satisfies 'SFN mod DRC=zero' (herein, DRC is the duration of a DRC in frames). Alternatively, an SFN which satisfies 'SFN mod DRC=offset' (herein, DRC is the duration of a DRC in frames) may be the start of the DRC. Offset may be any integer in the SFN. The offset may be signaled along with a discovery resource configuration.

In another embodiment, DRC starts at a subframe number 'sub FN' in an SFN where a DRC starts satisfies '(SFN*10+sub FN) mod DRC=offset' (DRC is the duration of a DRC in subframes and the offset is also specified in subframes). Each SFN may have 10 subframes numbered from 0 to 9.

In another embodiment, an 'n' bit SFN may be extended by 'x' bits. The most significant bit of extended SFN may be broadcasted along with discovery resource configuration or broadcasted in other SI. Alternatively, the most significant bit of extended SFN may be broadcasted along with discovery resource configuration or broadcasted in other SI if the DRC is longer than $2^n$ frames. For example, consider that n is equal to 10 bits. This means that SFN can have value from 0 to 1023. If the DRC is 4096 frames then SFN of size 12 bits is needed. The two MSBs of extended SFN are broadcasted along with discovery resource configuration. UE determines the extended SFN by appending the MSBs received to regular SFN bits. If the additional MSBs are broadcasted, the UE shall use the extended SFN, otherwise regular SFN is used to determine the start of DRC in the equations ('SFN mod DRC=offset' or '(SFN*0+sub FN) mod DRC=offset') explained above.

In another embodiment, if the discovery resource configuration is signaled in time 't' then an offset with respect to time 't' can be provided in discovery resource configuration. The time 't'+offset indicates the start of DRC. The 't' can be a frame or subframe in which discovery resource configuration is signaled. Alternately the 't' can be the frame/subframe corresponding to the end of SI window in which the discovery resource configuration is broadcasted. The offset can also be in units of frame or subframes. The offset can be positive as well as negative. This method does not require UE to use SFN.

In an embodiment, the offset value, DRC, the DRI and/or parameters for signaling discovery and non-discovery subframe in DRC may be the same for all cells with overlapping discovery resources in the network. In this case, frames and SFNs may be synchronized across the cells. An indicator may be transmitted in the signaling of the discovery resource configuration, which indicates whether the discovery resources are overlapping (that is, the same across all cells). In another embodiment, frame boundaries may be synchronized and SFNs may not be synchronized across the cells, so that aligned discovery resource cycle offsets may be set to different values in different cells.

In another embodiment, adjacent cells may have different offsets so that their DRIs (or discovery subframes/resources) may not overlap. A cell should select an offset in such a manner that its DRI (or discovery subframes/resources) may not overlap with the DRIs of neighbor cells. This will help a D2D-enabled UE to perform inter-cell discovery without skipping the DRI of a camped cell. The cell may also transmit the offsets and/or DRIs and/or parameters for signaling discovery and non-discovery subframe in DRC of the neighbor cells to assist the UE in inter-cell discovery.

In another embodiment, a set 'X' of discovery resources may be configured every DRC. A cell uses a subset of the set 'X' for discovery signal transmission in its coverage. Adjacent cells coordinate with each other so that subsets of the set 'X' selected by the cells may not overlap with each other. The cell signals the set 'X' and set 'Y' as a subset of 'X' used for discovery resources by the cell. A transmitting UE uses the resources in the set 'Y' for transmitting discovery information. A receiving UE uses the resources in the set 'X' for receiving discovery information.

In another embodiment in which cells are not synchronized with each other at radio frame and subframe levels, the cells may use an absolute system time to coordinate with each other so that the DRI of a cell may not overlap with the DRIs of its neighbor cells or may overlap as much as possible with the DRIs of its neighbor cells.

In an embodiment of the present disclosure, a cell may indicate whether its neighbor cells are synchronized with the cell.

Signaling Discovery Resource Configuration

In an embodiment of the present disclosure, a discovery resource configuration is broadcast to D2D-enabled UEs. The discovery resource configuration is broadcast in one or more of the following methods.

a) The discovery resource configuration is broadcast using a new system information block (SIB) in a SI message.

b) The discovery resource configuration is broadcast using a new downlink control information (DCI) format on a physical downlink common control channel (PDCCH). The cyclic redundancy check (CRC) of the PDCCH carrying this new DCI format may be masked with a D2D cell radio network temporary identifier (C-RNTI). The D2D C-RNTI is a new C-RNTI reserved to indicate resources for direct discovery.

c) The discovery resource configuration is broadcast using a new message (that is, a discovery resource message) transmitted in a downlink shared channel (DL-SCH) region. A PDCCH indicating resources for this message in the DL-SCH region may be masked with a D2D C-RNTI. The D2D C-RNTI is a new C-RNTI reserved to indicate resources for direct discovery.

Some of the parameters in the discovery resource configuration may be static in nature and other parameters may be dynamic in nature. For example, once configured, the periodicity of discovery resource allocation, that is, a DRC is not required to be changed. A DRI may have to be updated in the DRC to take care of the discovery load (the number of UEs participating in discovery and discovery signals transmitted by them). In an embodiment, if the DRI is configured in correspondence with the discovery load of the worst case in a cell, updating the DRI may be avoided. However, if the discovery load is low in the cell, this will lead to resource waste. Subframes designated as discovery subframes in the DRI may need to be updated based on the current usage of resources of UEs for UE-BS communication.

In an embodiment, the discovery resource configuration is broadcast using a new SIB, a PDCCH, or a discovery resource message. One or more discovery resource pools may be signaled by the BS as part of discovery resource configuration. The signaling of each of one or more discovery resource pools in the discovery resource configuration includes one or more of the following parameters:

DRC Duration;
DRI Duration;
Discovery subframe indication: all or part;
Discovery subframe bitmap and/or number of repetition of bitmap if DRI duration is not signaled;
Discovery subframe pattern info (that is, pattern 2 or 4 and the value of 'p'); and
Discovery channel indices in each subframe, RB indices which are reserved for discovery, or RB indices which are not meant for discovery.
  'StartPIBIndex' and 'EndPIBIndex' can be signaled to indicate discovery RBs in a discovery subframe. One or multiple sets of 'StartPRBIndex' and 'EndPRBIndex' can be signaled to indicate discovery RBs in a discovery subframe. For example, in an embodiment two sets, 'StartPRBIndex1' and 'EndPRBIndex1', and 'StartPRBIndex2' and 'EndPRBIndex2' can be signaled. Parameters 'StartPRBIndex' and 'EndPIBIndex' can be signaled for each discovery subframe. Alternately they are signaled only for one discovery subframe and the same is applied for all discovery subframes. Discovery transmissions on a sub-frame can occur only on the physical resource block (PRB) index greater than or equal to 'StartPRBIndex'. Discovery transmissions on a sub-frame can occur only on the PRB index lesser than or equal to 'EndPRBIndex'. Parameters which may be used for discovery resource configuration include the following:
Discovery category for each discovery subframe or discovery channel indices;
DRC offset; and
Pattern Some of the combinations of these parameters, which may be used for a discovery resource configuration, are as follows:

Option 1:
DRC Duration
DRI Duration

Option 2:
DRC Duration
DRI Duration
Discovery channel indices in each subframe, RB indices which are reserved for discovery, or RB indices which are not meant for discovery Option 3:
DRC Duration
DRI Duration
Discovery subframe indication: all or part
Discovery subframe bitmap or discovery subframe pattern info (that is, pattern 2 or 4 and the value of 'p') and/or number of repetition of bitmap if DRI duration is not signaled Option 4:
DRC Duration
DRI Duration
Discovery subframe indication: all or part
Discovery subframe bitmap or discovery subframe pattern info (that is, pattern 2 or 4 and the value of 'p') and/or number of repetition of bitmap if DRI duration is not signaled
Discovery channel indices in each subframe, RB indices which are reserved for discovery, or RB indices which are not meant for discovery.
  'StartPRBIndex' and 'EndPRBIndex' can be signaled to indicate discovery RBs in a discovery subframe. One or multiple sets of 'StartPRBIndex' and 'EndPRBIndex' can be signaled to indicate discovery RBs in a discovery subframe. Parameters 'StartPRBIndex' and 'EndPRBIndex' can be signaled for each discovery subframe. Alternately they are signaled only for one discovery subframe and the same is applied for all discovery subframes.

Preferred Option: Discovery resource pool is signaled using the following parameters. One or more pools may be signaled.
DRC Duration
DRI Duration (This is optional. Not needed if NumRepetition is there)
DRC Offset
Discovery channel indices in each subframe, RB indices which are reserved for discovery, or RIB indices which are not meant for discovery, 'StartPRBIndex' and 'EndPRBIndex' can be signaled to indicate discovery RBs in a discovery subframe. One or multiple sets of 'StartPRBIndex' and 'EndPRBIndex' can be signaled to indicate discovery RBs in a discovery subframe. Parameters 'StartPRBIndex' and 'EndPRBIndex' can be signaled for each discovery subframe. Alternately, they are signaled only for one discovery subframe and the same is applied for all discovery subframes.
Discovery subframe bitmap Length ('N') and corresponding bitmap
Number of repetition of bitmap ('NumRepetition') (This is optional. Not needed if DRI duration is there)
Type of resources (Type 1 or Type 2 or common)

Pool may be a transmission (TX) pool or a reception (RX) pool

Each of the options mentioned above may also include a DRC offset and other combinations may be used as well. In an embodiment, discovery categories may be different for different DRCs. For example, an odd DRC may be used for open direct discovery whereas an even DRC may be used for restricted direct discovery. A specific DRC for a specific discovery resource category may be indicated.

In an embodiment of the present disclosure, a DRI duration may be configured to be equal to a DRC duration. In this case, selective subframes for discovery are indicated in the DRC. In this case, the DRC duration is signaled. The discovery subframe bitmap or discovery subframe pattern info (that is, pattern 2 or 4 and the value of 'p') is also signaled. Additionally, discovery channel indices in each subframe, RB indices which are reserved for discovery, or RB indices which are not meant for discovery are also signaled.

In another embodiment of the present disclosure, a DRC and a DRI may be configured to be multiples of a cell-specific discontinuous exception (DRX) cycle. In this embodiment, a UE which is interested in transmitting discovery information in the DRI transmits discovery information in a subframe of the DRI which corresponds to its paging occasion in its DRX cycle.

Signaling Discovery Resource Configuration Using PDCCH

In an embodiment of the present disclosure, a discovery resource configuration may be signaled on a PDCCH. If SI needs to be dynamically (or semi-statically) configured, the PDCCH has an advantage over an SIB-based approach.

Figure 7:
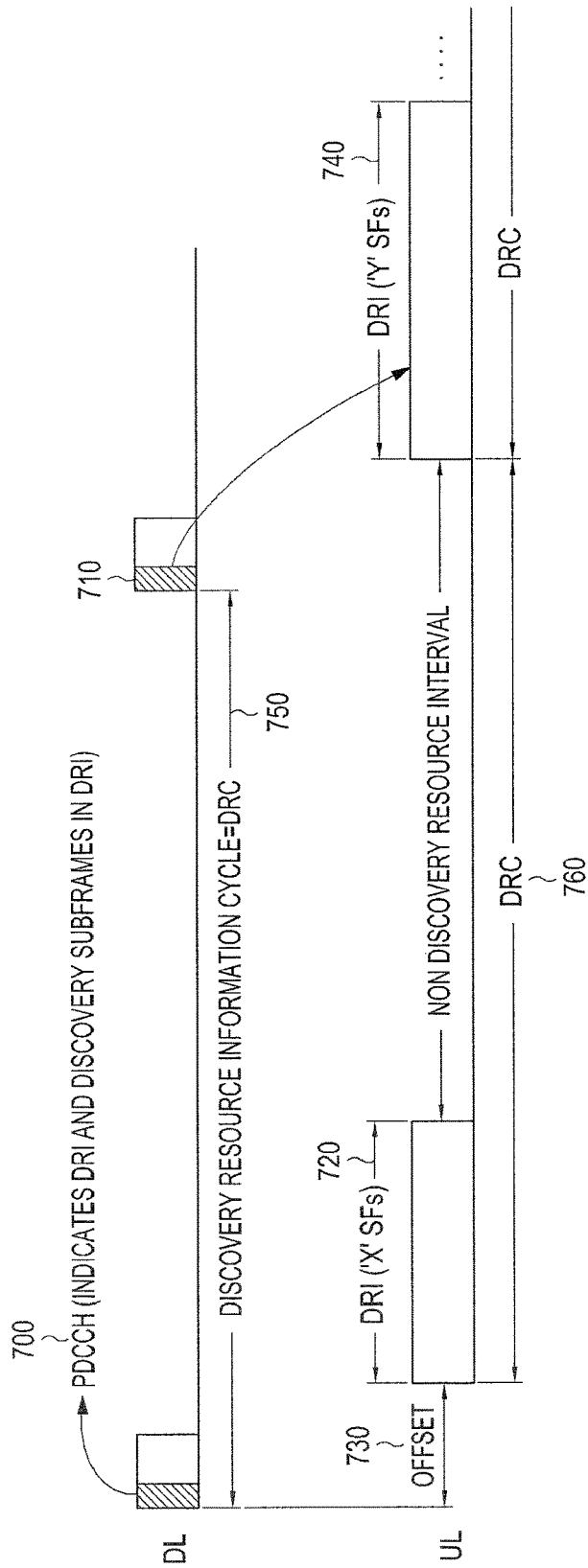
FIG. 7 illustrates a discovery resource configuration using a physical downlink control channel (PDCCH) according to various embodiments of the present disclosure.

FIG. 7 illustrates a discovery resource configuration using a PDCCH according to an embodiment of the present disclosure.

Referring to FIG. 7, PDCCHs 700 and 710 carrying discovery resource information are transmitted every discovery resource information cycle 750. The PDCCHs 700 and 710 indicate the sizes of DRIs 720 and 740 and discovery resources included in the DRIs 720 and 740. A PDCCH CRC may be masked with a D2D C-RNTI. The discovery resource information cycle 750 is equal to a DRC.

A DRC 760 may start after an offset 730 from the beginning of the discovery resource information cycle 750. The offset 730 is needed to allow a time to receive and process PDCCH information, select resources for discovery information transmission, and build a discovery information packet. The DRC 760 may be configured using a PDCCH or an SI message. In this case, PDCCH monitoring for discovery resource information may be independent of a UE's idle mode DRX cycle.

A D2D-enabled UE wakes up at the beginning of the discovery resource information cycle 750 and receives and decodes a PDCCH carrying a discovery resource configuration. The discovery resource information cycle in which the discovery resource configuration may be changed is configurable to prevent the D2D-enabled UE from waking up in every discovery resource information cycle to receive and decode the PDCCH. In order to improve the reliability of the PDCCH, the PDCCH may be repeated a plurality of times in the discovery resource information cycle.

Figure 8:
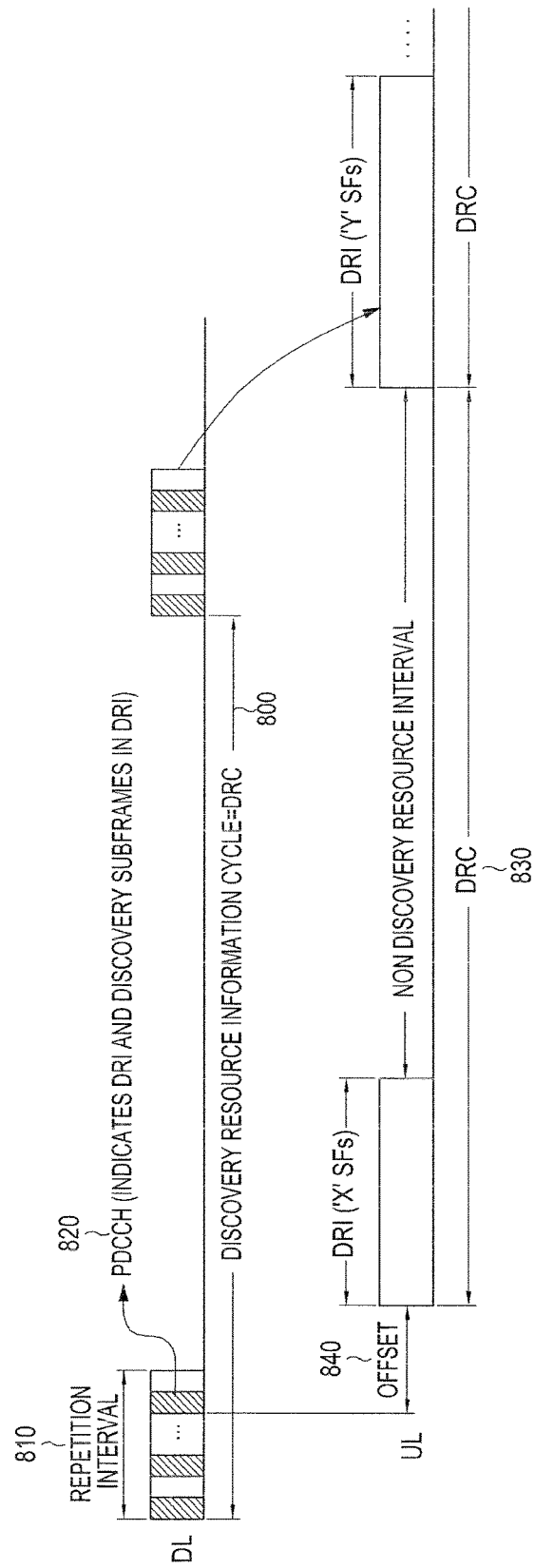
FIG. 8 illustrates a discovery resource configuration using a PDCCH transmitted a plurality of times according to various embodiments of the present disclosure.

FIG. 8 illustrates a discovery resource configuration using a PDCCH transmitted a plurality of times according to an embodiment of the present disclosure.

Referring to FIG. 8, a PDCCH 820 carrying discovery resource information may be transmitted a plurality of times during a repetition interval 810 in a discovery resource information cycle (DRC) 800. A DRC 830 starts after an offset 840 from a time of transmitting a last PDCCH 820 in the repetition interval 810. The offset 840 is needed to allow a time to receive and process PDCCH information, select resources for discovery information transmission, and build a discovery information packet.

In an embodiment, a DRC, a DRI, and a discovery subframe may be configured using an SI message. The DRI and discovery subframe(s) configured using the SI message may be a minimum configuration. An updated DRI (extended DRI) and additional discovery subframes are indicated by a PDCCH in every discovery resource information cycle as illustrated in FIGS. 7 and 8. If a D2D-enabled UE fails to decode a PDCCH, it always uses the minimum configuration signaled by the SI message.

In an embodiment of the present disclosure, a discovery resource information cycle may be aligned with a D2D-enabled UE's idle mode DRX cycle. The discovery information resource cycle is configured to be a multiple of a DRX cycle, as illustrated in FIG. 9.

Figure 9:
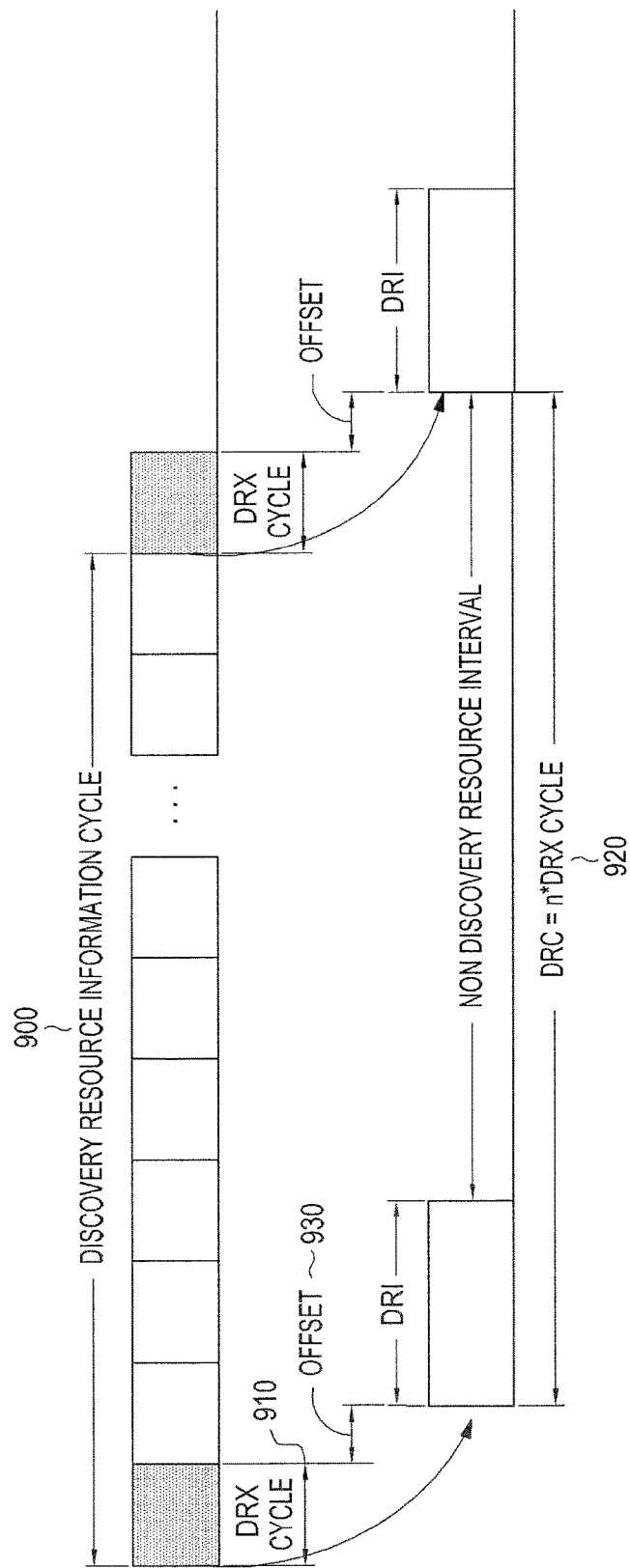
FIG. 9 illustrates a discovery resource configuration using a PDCCH based on a discontinuous reception (DRX) cycle according to various embodiments of the present disclosure.

FIG. 9 illustrates a discovery resource configuration using a PDCCH based on a DRX cycle according to an embodiment of the present disclosure.

Referring to FIG. 9, a discovery resource information cycle 900 starts earlier than a DRC 920 by a DRX cycle 910 and an offset 930 between the DRC 920 and the DRX cycle 910. A last paging occasion in the DRX cycle 910 may exist in a last subframe of a last frame included in the DRX cycle 910. Therefore, an additional time, that is, the offset 930 is needed to process PDCCH information and apply the processed PDCCH information to the DRC 920.

In each paging occasion of the DRX cycle 910 at the beginning of the discovery resource information cycle 900, a PDCCH carrying discovery resource information may be repeatedly transmitted. Each D2D-enabled UE wakes up in every idle DRX cycle of the D2D-enabled UE and receives and decodes the PDCCH carrying discovery resource information in its idle DRX cycle which falls in the beginning of the discovery resource information cycle.

In an embodiment of the present disclosure, a discovery resource information cycle may be aligned with a D2D-enabled UE's idle mode DRX cycle. The discovery resource information cycle may or may not be a multiple of a DRX cycle, as illustrated in FIG. 10.

Figure 10:
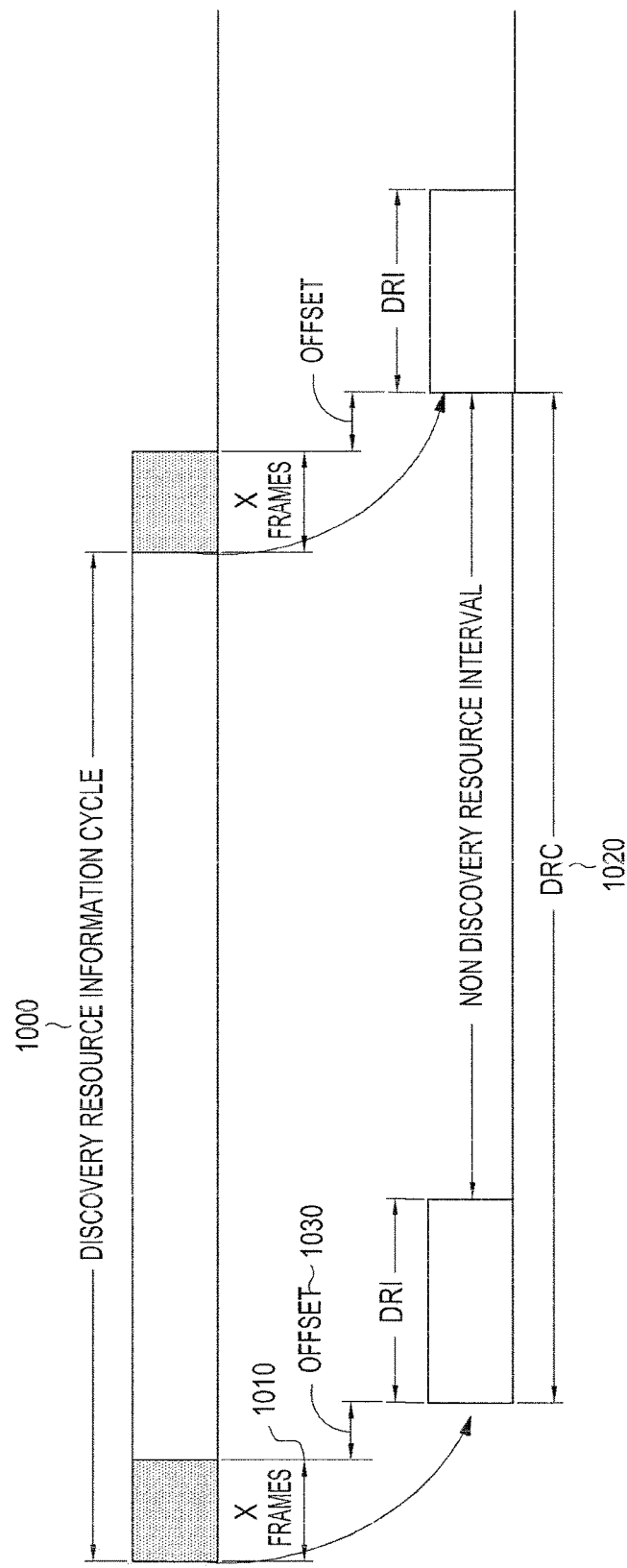
FIG. 10 illustrates a discovery resource configuration using a PDCCH based on a DRX cycle according to various embodiments of the present disclosure.

FIG. 10 illustrates a discovery resource configuration using a PDCCH based on a DRX cycle according to another embodiment of the present disclosure.

Referring to FIG. 10, a discovery resource information cycle 1000 starts earlier than a DRC 1020 by X frames 1010 (X is the number of frames included in a DRX cycle) and an offset 1030 between the DRC 1020 and the X frames 1010. In each paging occasion during the X frames 1010 at the beginning of the discovery resource information cycle 1000, a PDCCH carrying discovery resource information may be repeatedly transmitted. Each D2D-enabled UE wakes up in every idle DRX cycle of the D2D-enabled UE and receives and decodes the PDCCH carrying discovery resource information in its idle DRX cycle which falls in the beginning of the discovery resource information cycle.

Signaling Discovery Resource Configuration Using PDCCH and SI Message

In an embodiment of the present disclosure, discovery resource may be configured in two steps. A discovery resource configuration including a DRC, a DRI, and a discovery subframe may be configured using an SIB in an SI message in a first step and discovery resources in each of the discovery subframes configured using the SI message may be configured dynamically using a PDCCH in a second step. The aforesaid concept is illustrated in FIG. 11.

Figure 11:
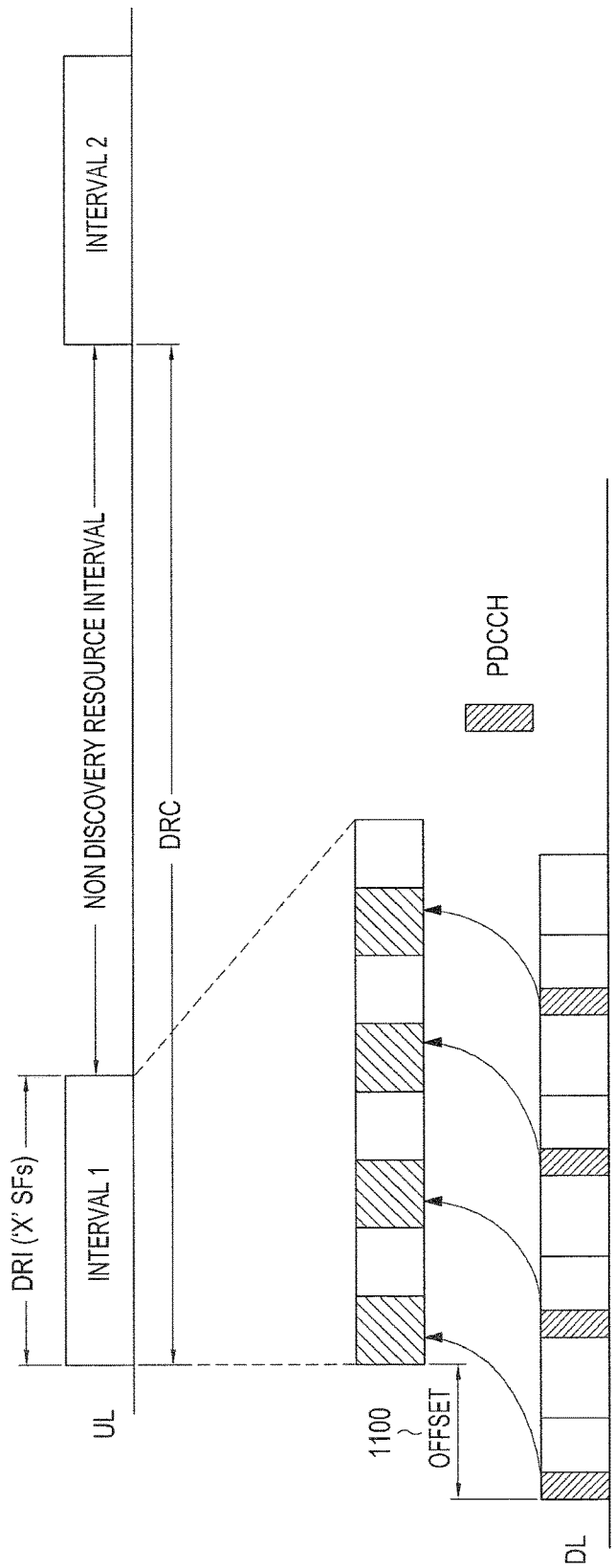
FIG. 11 illustrates a discovery resource configuration using a system information (SI) message and a PDCCH according to various embodiments of the present disclosure.

FIG. 11 illustrates a discovery resource configuration using an SI message and a PDCCH according to an embodiment of the present disclosure.

Referring to FIG. 11, a PDCCH indicating discovery resources is transmitted in a Downlink (DL) subframe corresponding to each discovery subframe. The PDCCH indicating discovery resources may be masked with a D2D C-RNTI. The DL subframe carrying the PDCCH for the discovery subframe is apart from that discovery subframe by an offset 1100. The offset 1100 is needed to allow a time to receive and process PDCCH information, select resource for discovery information transmission/reception, and build a discovery information packet.

A D2D-enabled UE participating in discovery first reads an SI message and determines a DRC, a DRI, and discovery subframes. The D2D-enabled UE then receives and decodes a PDCCH masked with a D2D C-RNTI in a DL subframe corresponding to each discovery subframe during the DRI in every DRC.

Figure 12:
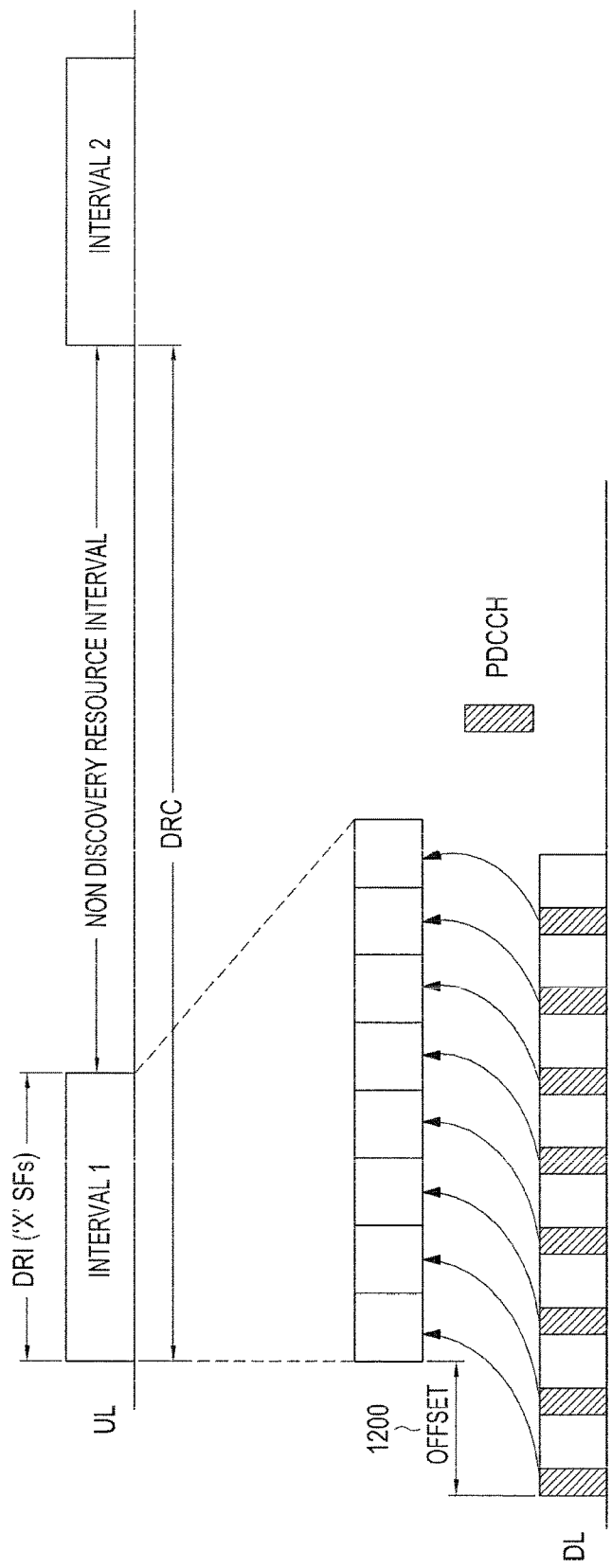
FIG. 12 illustrates a discovery resource configuration using an SI message and a PDCCH according to various embodiments of the present disclosure.

In another embodiment of the present disclosure, a discovery resource configuration including a DRC and a DRI may be configured using an SIB in an SI message in a first step and discovery resources in each of subframes in the DRI may be configured dynamically using a PDCCH in a second step, as illustrated in FIG. 12.

FIG. 12 illustrates a discovery resource configuration using an SI message and a PDCCH according to another embodiment of the present disclosure.

Referring to FIG. 12, a PDCCH indicating discovery resources is transmitted in a DL subframe corresponding to each subframe in a configured DRI. The PDCCH indicating discovery resources may be masked with a D2D C-RNTI. The DL subframe carrying the PDCCH for the subframe in the DRI is apart from that subframe by an offset 1200. The offset 1200 is needed to allow a time to receive and process PDCCH information, select resources for discovery information transmission/reception, and build a discovery information packet.

A D2D-enabled UE participating in discovery first reads an SI message and determines a DRC and a DRI. The D2D-enabled UE then receives and decodes a PDCCH masked with a D2D C-RNTI in the DL subframe corresponding to each subframe during the DRI in every DRC.

In another embodiment of the present disclosure, a discovery resource configuration including a DRC may be configured using an SIB in an SI message in a first step. Here, a DRI and discovery subframes in the DRI may be configured dynamically using a PDCCH at the beginning of each DRC in a second step. In a third step, discovery resources in each of the discovery subframes may be configured dynamically by the PDCCH, as illustrated in FIG. 13.

Figure 13:
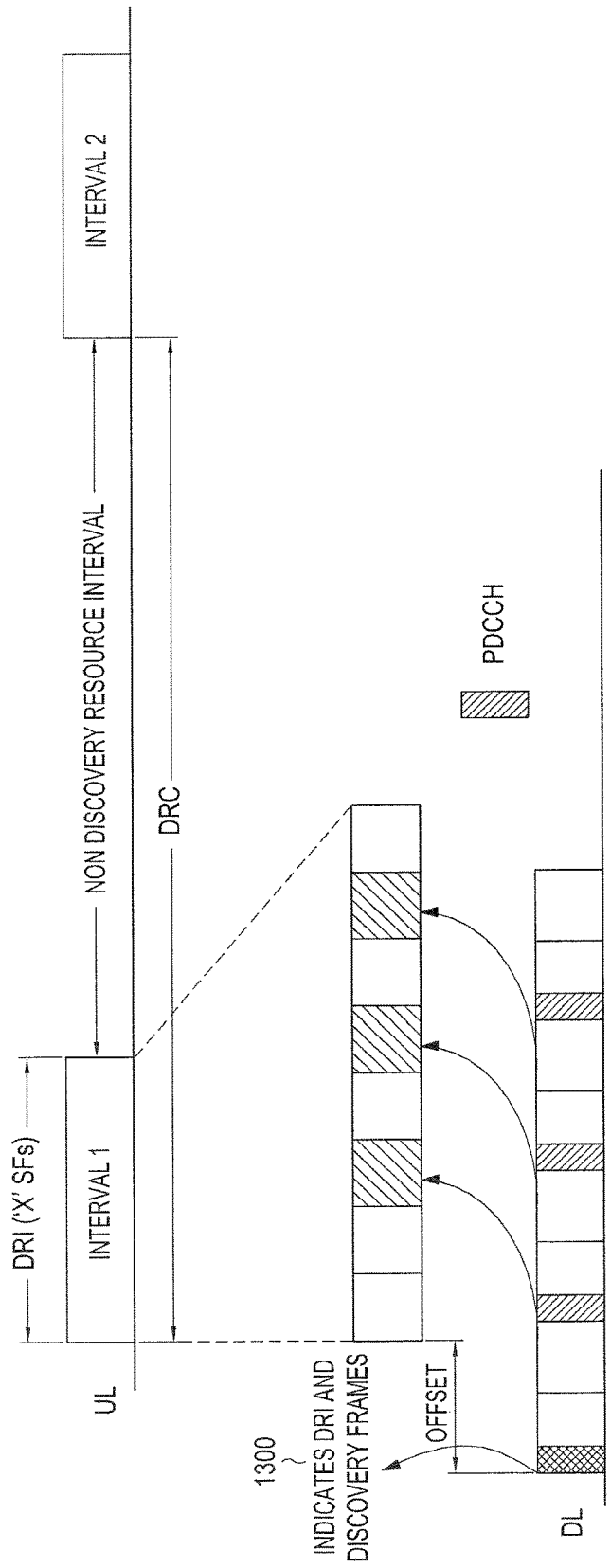
FIG. 13 illustrates a discovery resource configuration using an SI message and a PDCCH according to various embodiments of the present disclosure.

FIG. 13 illustrates a discovery resource configuration using an SI message and a PDCCH according to another embodiment of the present disclosure.

Referring to FIG. 13, a DL subframe 1300 corresponding to a first subframe of a DRC indicates a DRI and discovery subframes in the DRI. A PDCCH in a DL subframe corresponding to each of the discovery subframes indicates discovery resources in the discovery subframe.

In another embodiment of the present disclosure, a discovery resource configuration including a DRC may be configured using an SIB in an SI message in a first step. In a second step, a DRI may be configured dynamically using a PDCCH at the beginning of each DRC. In a third step, discovery resources in each of subframes in the DRI may be configured dynamically by the PDCCH, as illustrated in FIG. 14.

Figure 14:
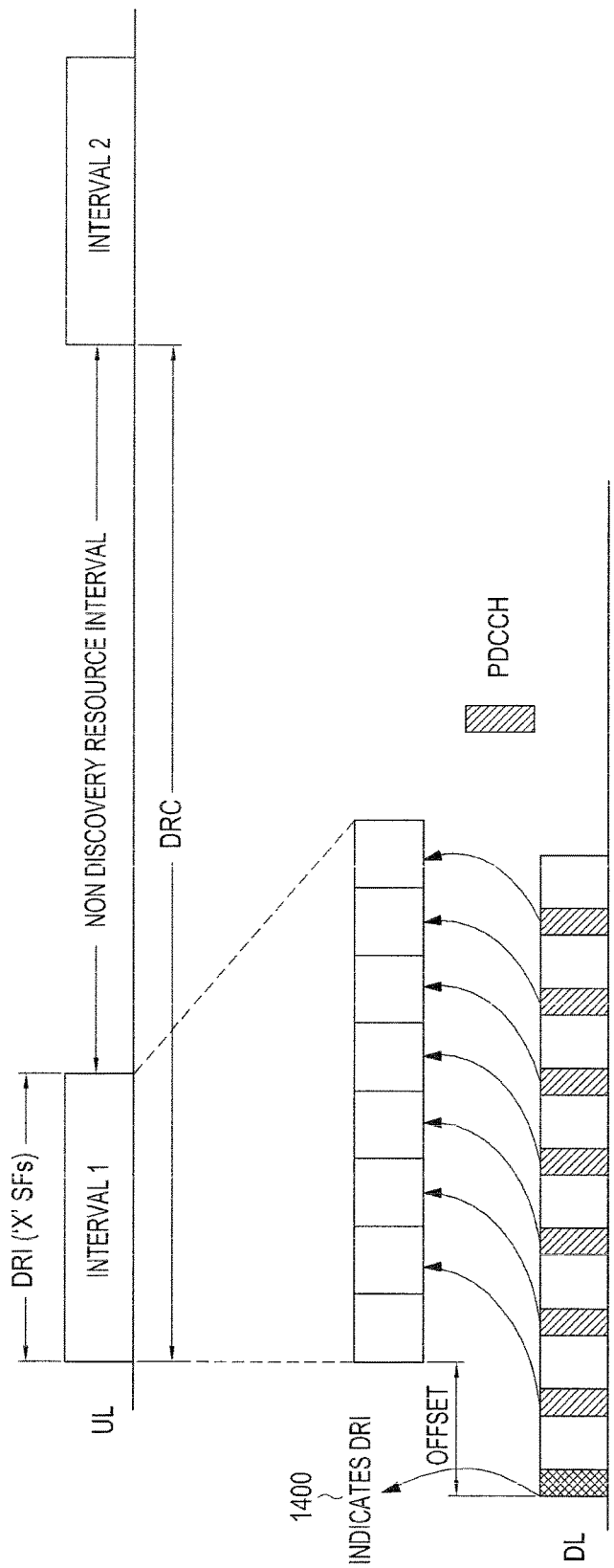
FIG. 14 illustrates a discovery resource configuration using an SI message and a PDCCH according to various embodiments of the present disclosure.

FIG. 14 illustrates a discovery resource configuration using an SI message and a PDCCH according to another embodiment of the present disclosure.

Referring to FIG. 14, a DL subframe 1400 corresponding to a first subframe of a DRC indicates a DRI. A PDCCH in a DL subframe corresponding to each of subframes in the DRI indicates discovery resources in the subframe.

Method for Updating Discovery Resources

A DRC includes discovery resources. D2D-enabled UEs participating in discovery use these discovery resources in a contention-based manner. The discovery resources may be configured based on a discovery load by the network. The network may change the discovery resources in the DRC based on the discovery load. The network may determine the discovery load in one of the following methods.

a) A D2D-enabled UE which wants to transmit discovery information monitors discovery resources in a DRC to determine available discovery resources (that is, discovery resources not used by other D2D-enabled UEs). The D2D-enabled UE determines whether discovery resources are available by measuring a signal energy or decoding a discovery channel transmitted in each discovery resource. When the D2D-enabled UE fails to find available resources for discovery for a predetermined time period, it transmits a discovery resource update message/indication to the network (that is, a BS). The discovery resource update message may include information about resources (for example, information about a number of resources) that the UE needs for discovery. This message may be an indication to the network to increase discovery resources. The network may increase discovery resources based on the number of UEs from which the network has received the above message. A time interval between two discovery resource update messages/indications transmitted by a D2D-enabled UE may be defined to avoid frequent transmissions of the discovery resource update message/indication.

b) A D2D-enabled UE which wants to transmit discovery information monitors discovery resources in a DRC to determine available discovery resources (that is, discovery resources not used by other D2D-enabled UEs). When the D2D-enabled UE determines that the number of available discovery resources is less than a predefined threshold, it transmits a discovery resource update message/indication to the network. Alternatively or additionally, when the D2D-enabled UE determines that the number of unavailable (that is, used) resources is greater than a predefined threshold, it transmits a discovery resource update message/indication to the network. This may be an indication to the network to increase discovery resources. The D2D-enabled UE determines whether discovery resources are available by measuring a signal energy or decoding a discovery channel transmitted on each discovery resource. The predefined threshold may be configured by the network. A time interval between two discovery resource update messages/indications transmitted by a D2D-enabled UE may be defined to avoid frequent transmissions of the discovery resource update message/indication. In an embodiment, a plurality of threshold levels (for example, high, low, and medium) may be defined instead of one threshold level. In an embodiment, a D2D-enabled UE may periodically transmit information about already used or available resources based on its sensing.

c) A D2D-enabled UE which wants to transmit discovery information monitors discovery resources in a DRC to determine available discovery resources (that is, discovery resources not used by other D2D-enabled UEs). When the D2D-enabled UE determines that the number of available discovery resources is greater than a predefined threshold, it transmits a discovery resource update message/indication to the network. Alternately or additionally, when the D2D-enabled UE determines that the number of unavailable (that is, used) resources is less than a predefined threshold, it transmits a discovery resource update message/indication to the network. This may be an indication to the network to decrease discovery resources. The D2D-enabled UE determines whether discovery resources are available by measuring a signal energy or decoding a discovery channel transmitted in each discovery resource. The predefined threshold may be configured by the network. A time interval between two discovery resource update messages/indications by a D2D-enabled UE may be defined to avoid frequent transmissions of the discovery resource update message/indication. In an embodiment, a plurality of threshold levels (for example, high, low, and medium) may be defined instead of one threshold level.

d) A BS may measure a signal energy or decode a discovery channel transmitted in discovery resources and determine the utilization of the discovery resources. Based on the determined utilization and/or feedbacks from D2D-enabled UEs, the network may increase or decrease the discovery resources.

e) A D2D-enabled UE which is monitoring discovery resources to receive discovery information may assist the network in updating the discovery resources. The monitoring D2D-enabled UE monitors all discovery resources. Based on the result of receiving and decoding a discovery channel in discovery resources, the monitoring UE knows how much discovery resources are used and how much discovery resources are not used. When the D2D-enabled UE monitoring discovery resources determines that the number of used resources is greater than a predefined threshold, it transmits a discovery resource update message/indication to the network. In an embodiment, a plurality of threshold levels (for example, high, low, and medium) may also be defined instead of one threshold level. In an embodiment, the D2D-enabled UE may periodically transmit information about already used or available discovery resources without comparing the number of the resources with a predefined threshold.

A time interval between two discovery resource update messages/indications transmitted by the D2D-enabled UE may be defined to avoid frequent transmissions of the discovery resource update message/indication.

To avoid transmissions of the discovery resource update message/indication from a plurality of D2D-enabled UEs receiving the discovery information, different D2D-enabled UEs may be configured to transmit discovery resource update messages/indications in different DRCs. Association of a D2D-enabled UE with a DRC for transmitting a discovery resource update message/indication may be based on its identity.

In an embodiment, one or more fixed time frequency resources may be reserved for transmitting a discovery resource update message/indication to a BS. A plurality of threshold levels (for example, high, low, and medium) may be defined instead of one threshold level. In this case, there is one-to-one mapping between the fixed time frequency resources and discovery resource update messages/indications specific to the threshold levels. An RB pair(s) similar to a PUCCH may be reserved in a subframe for transmitting a discovery resource update message/indication. Physical layer parameters (modulation, coding, and the like) for transmission in these reserved RB pair(s) may also be fixed. In an embodiment, these parameters are the same as a discovery channel. In another embodiment, these parameters may be the same as a random access channel. An RB pair(s) of a discovery subframe or a non-discovery subframe may be reserved. The RB pair(s) may be reserved periodically. In one example, an RB pair(s) may be reserved in every DRC. In another example, an RB pair(s) may be reserved once every 'n' DRCs. Herein, 'n' may be larger than 1. Even if a plurality of D2D-enabled UEs transmit the messages/indications simultaneously in these resources, there will not be any problem because message/indication contents and physical layer parameters (modulation, coding, and the like) are fixed and the same for all UEs. In an embodiment, an access channel sequence may be transmitted in fixed time and frequency resources, instead of in a message. In an embodiment, one or more access channel sequences may be reserved for transmission in fixed time and frequency resources, instead of in a message. One access channel sequence may be used for a specific threshold level indication/message.

In another embodiment, the network may determine a discovery load as follows. A D2D-enabled UE which wants to transmit discovery information transmits a message to a BS. The message may include information about a number of discovery resources that the D2D-enabled UE will use. The message may also include information about a time period during which the D2D-enabled UE will use the discovery resources. When it stops transmitting discovery information, the D2D-enabled UE may transmit a message to the BS. This message may not be needed if a time period is already indicated in the message transmitted to the BS when the UE started transmitting the discovery information. In an embodiment, the BS forwards these messages received from the UE to a centralized coordinator. The centralized coordinator updates discovery resources and informs all BSs of the updated discovery resources. The centralized coordinator may perform the update periodically instead of performing the update every time a message is received from a UE. In another embodiment, the BS may perform the discovery resource update based on a message(s) received from a UE(s).

Resource Selection by D2D-Enabled UE for Transmitting Discovery Information

A D2D-enabled UE transmitting discovery information needs to know time and frequency resources that it needs to use for transmitting the discovery information. The following options may be used for the selection of resources for transmitting discovery information.

1. Contention-based resource selection from among configured discovery resources: In order to receive a dedicated resource assignment, the D2D-enabled UE has to transmit a request to a camped cell. The D2D-enabled UE transmitting the discovery information may be mobile in nature. Because of the mobility of D2D-enabled UEs, their camped cell may change often and thus the D2D-enabled UE has to transmit a request to a new cell almost every DRC. This leads to a significant signaling overhead in the system. Thus, a contention-based resource selection protocol may be preferred for mobile D2D-enabled UEs. A mobile D2D-enabled UE uses the contention-based resource selection protocol for selecting resources from among discovery resources configured by the network. In one method, the contention-based protocol includes a method for randomly selecting discovery resources from among a plurality of discovery resources, for transmitting discovery information. In an embodiment, a D2D-enabled UE may use a maximum number of 'n' discovery resources per DRC. This may help in reducing collisions. The parameter 'n' is configured by the network. A default value of 'n' may be set to 1.

2. Dedicated resource assignment: All D2D-enabled UEs may not be highly mobile. Dedicated time and frequency resources from among allocated time frequency resources for D2D direct discovery may be allocated to a D2D-enabled UE(s) with no mobility (that is, stationary). The no-mobility may be determined based on user subscriptions by the network. For example, D2D-enabled UEs installed in commercial establishments for advertisements may be stationary. For a plurality of stationary D2D-enabled UEs, the network may prioritize dedicated resource assignments based on paid subscription fees. A D2D-enabled UE may indicate that it is stationary when it registers with the network. Dedicated resources are allocated from among discovery resources configured by the network. The dedicated resources may be allocated in a semi-static manner. If a time duration of the dedicated resources expires, the D2D-enabled UE may make the request again. Dedicated discovery resources and non-dedicated discovery resources may exist in each DRC. Alternatively, some DRCs may be configured for dedicated resource assignment only.

Dedicated resources may be allocated to one or more of the following UEs:

a) stationary UEs installed in commercial establishments;
b) premium UEs paying more subscription or usage fees;
c) UEs in connected mode;
d) UEs with discovery applications requiring high quality of service; and
e) UEs which need to be tracked by a BS for lawful interception. The BS should allocate a type 2 discovery subframe for lawful interception such that it is not followed by a subframe in which UE to BS transmission is scheduled. The BS uses different timings to receive UE to BS transmissions and discovery transmissions of a UE.

If the dedicated resources can be allocated to D2D-enabled UEs for transmitting discovery information, the BS should broadcast discovery resource information as follows.

A discovery resource signaling basically indicates which subframes have resources for discovery and which RBs are for discovery in each of these subframes. The BS indicates which discovery resources are common (non-UE specific) and which discovery resources are dedicated. In an embodiment, all RBs reserved for discovery in a subframe may be for common usage or for dedicated discovery usage. This means that the discovery subframe has either common discovery resources or dedicated discovery resources and not both. The network signals which subframe has common discovery resources and which subframe has dedicated discovery resources. In another embodiment, some of the RBs reserved for discovery in a subframe may be for common usage or for dedicated discovery usage. This means that the discovery subframe has both common discovery resources and dedicated discovery resources. The network signals which RBs reserved for discovery are common discovery resources and which RBs reserved for discovery are dedicated discovery resources. In another embodiment, a DRI may be partitioned into a dedicated discovery zone and a common discovery zone in the time domain. All discovery resources reserved in subframes corresponding to the dedicated discovery zone are dedicated discovery resources. All discovery resources reserved in subframes corresponding to the common discovery zone are common discovery resources. In another embodiment, a DRI may be partitioned into a dedicated discovery zone and a common discovery zone in the frequency domain.

A BS may signal a pool of type 1 discovery resources as a discovery resource transmission (Tx) Pool. The BS signals the summation of a pool of type 1 discovery resources and a pool of type 2 discovery resources as a discovery resource reception (Rx) pool. Alternately, the BS may signal a pool of type 1 discovery resources. BS may also signal a pool of Type 2 discovery resources. The pool of type 1 discovery resources may be used by the UE for transmitting. Summation of a pool of type 1 discovery resources and a pool of type 2 discovery resources may be used by the UE for reception.

If a UE transmitting discovery information has not been allocated discovery resources, it does not use discovery resources marked as dedicated discovery resources. The UE uses only discovery resources marked as common discovery resources.

If a UE is in connected mode, communicating with a BS, and transmits discovery information, the following rules may be applied for the UE to transmit discovery information and UL signals to the BS.

a) A D2D-enabled UE does not transmit a PUCCH and a D2D transmission in the same subframe because the D2D UE uses a DL timing for D2D transmissions whereas a timing based on UL synchronization is used for PUCCH transmissions. In an embodiment, the BS schedules PUCCHs such that a D2D-enabled UE in connected mode may not have to transmit a PUCCH in a D2D subframe. The D2D-enabled UE indicates to the BS whether it wants to transmit D2D transmissions while communicating with the BS. In the case of a dedicated discovery resource assignment, the BS may allocate discovery resources to the UE in a subframe in which a PUCCH transmission is not scheduled. In another method, if the D2D-enabled UE has to transmit a PUCCH in a D2D subframe, the D2D-enabled UE does not transmit D2D transmissions in the D2D subframe.

b) A D2D-enabled UE does not transmit a D2D transmission in subframe 'x' and a transmission (e.g. PUCCH/PUSCH/D2D Data packets) wherein timing advanced (TA) is applied in subframe 'x−1'. In an embodiment, the BS takes care of this by scheduling such that a transmission based on TA in a subframe following the subframe with non TA based transmission may be avoided. The D2D-enabled UE indicates to the BS whether it wants to transmit D2D-transmissions while communicating with the BS. In the case of a dedicated discovery resource assignment, the BS may allocate discovery resources to the UE in a subframe which is not preceded by a subframe in which a PUCCH/PUSCH transmission is scheduled. In another embodiment, the UE does not perform a D2D transmission in subframe 'x' if it has to perform a transmission (e.g. PUCCH/PUSCH/D2D Data packets) wherein TA is applied in subframe 'x+1'. UE maintains subframe timing with respect to a DL signal received from the BS. For UL transmission the BS provides a value by which the UE should advance the timing for UL transmission. Applying TA in subframe 'x+1' means that if subframe 'x+1' starts at time t=t1 based on a DL signal received from the BS then it starts transmission corresponding to subframe 'x+1' at t=t1−timing advanced. In an embodiment, the UE does not perform a D2D transmission in subframe 'x' if it has to perform a transmission (e.g. PUCCH/PUSCH/D2D Data packets) wherein the TA>'p' and an orthogonal frequency-division multiplexing (OFDM) symbols duration is applied in subframe 'x+1', where 'p' is a number of OFDM symbols at the end of subframe 'x' which are not used for D2D transmission in subframe 'x'.

Resource Selection by D2D-Enabled UE for Receiving Discovery Information

If the contention-based resource selection protocol is used, a D2D-enabled UE monitoring discovery information does not know resources selected by a D2D-enabled UE transmitting the discovery information. In an embodiment, therefore, the D2D-enabled UE monitoring the discovery information monitors all discovery resources (common as well as dedicated) configured for D2D direct discovery.

In an embodiment, if the discovery information transmission is targeted to a specific D2D-enabled UE, the transmitting D2D-enabled UE may determine resources from among a plurality of resources by hashing resource indices with a target D2D identifier (ID). In this case, the D2D-enabled UE receiving the discovery information selects the resources by hashing with its D2D ID.

In an embodiment, the transmitting D2D-enabled UE may determine resources from among a plurality of resources by hashing with its D2D ID. In this case, the D2D UE receiving the discovery information selects the resources by hashing with a D2D ID which it wants to monitor.

If dedicated resources are used by the D2D-enabled UE transmitting the discovery information, one or more D2D-enabled UEs monitoring the discovery information may know the discovery resources through the network (for example, a proximity service (ProSe) server). The BS or UE may inform the ProSe Server of the dedicated resources. However, this is possible only for the transmitting D2D-enabled UE(s) with no mobility.

In an embodiment, for a simple and efficient design, the D2D-enabled UE monitoring the discovery information monitors all discovery resources configured for D2D direct discovery.

Some of the methods of signaling discovery resources in the foregoing methods are as follows. In all these options, some or all listed parameters may be transmitted to signal a resource configuration.

TABLE 1

| Options | Parameters of Discovery Resource Configuration |
|---|---|
| Option 1 | 1) DiscoveryResourceCycle;<br>Note: Some specific values for discovery resource cycle can be pre defined and index can be used to indicate in signaling instead of absolute value of discovery resource cycle.<br>Note: SFN mod DiscoveryResourceCycle = DiscoveryResourceCycleOffset. 'SFN' is system frame number of start of Discovery Resource Cycle;<br>OR (SFN * 10 + sub frame number) mod DiscoveryResourceCycle = DiscoveryResourceCycleOffset. 'SFN' is system frame number; Discovery Resource Cycle starts at subframe number in SFN.<br>2) DiscoveryResourceCycleOffset<br>3) NumNonDiscoverySF;<br>Note: This can be a bit map or absolute number<br>4) ResourceAllocationSupportedTypes (Type 1 and/or Type 2)<br>Note: Indicates whether network or cell supports Type 1 and/or Type 2 resource allocation<br>mechanisms. Type 1 is contention based resource allocation and Type 2 is dedicated resource<br>allocation.<br>5) TX Resource Pool: Resources (Type 1) used by transmitting UE<br>  a. NumTxSF;<br>  b. Discovery Resources in each discovery subframe amongst the 'NumTxSF' subframes in the beginning of Discovery Resource Cycle;<br>    Note: Non discovery subframes in 'NumTxSF' are determined based on parameter NumNonDiscoverySF<br>6) RX Resource Pool:<br>  a. NumRxSF;<br>  b. Discovery Resources in each discovery subframe amongst the 'NumRxSF' subframes in beginning of Discovery Resource Cycle;<br>    Note: Non discovery subframes in 'NumRxSF' are determined based on parameter<br>      NumNonDiscoverySF<br>        Note: NumRxSF <= NumTxSF |
| Option 2 | 1) DiscoveryResourceCycle;<br>2) DiscoveryResourceCycleOffset<br>3) NumNonDiscoverySF;<br>4) ResourceAllocationSupportedTypes (Type 1 and/or Type 2)<br>5) Type 1 Resource Pool:<br>  a. NumType1SF;<br>  b. Discovery Resources in each discovery subframe amongst the 'NumType1SF' subframes in the beginning of Discovery Resource Cycle;<br>    Note: Non discovery subframes in 'NumType1SF' are determined based on parameter<br>      NumNonDiscoverySF<br>6) Type 2 Resource Pool:<br>  a. NumType2SF;<br>  b. Discovery Resources in each discovery subframe amongst the 'NumType2SF' subframes following 'NumType1SF' subframes in the Discovery Resource Cycle or from the beginning of discovery resource cycle; |

TABLE 1-continued

| Options | Parameters of Discovery Resource Configuration |
|---|---|
| | Note: Non discovery subframes in 'NumType2SF' are determined based on parameter NumNonDiscoverySF |
| | Note: TX Resource Pool = Type 1 Resource Pool; |
| | Note: RX Resource Pool = Type 1 Resource Pool + Type 2 Resource Pool; |

TABLE 2

| Options | Parameters of Discovery Resource Configuration |
|---|---|
| Option 3 | 1) DiscoveryResourceCycle;<br>2) DiscoveryResourceCycleOffset<br>3) DiscoveryResourceDuration or NumSFs<br>4) ResourceAllocationSupportedTypes (Type 1 and/or Type 2)<br>5) DiscoveryNonDiscoverySF (bitmap of size NumSFs): Indicate which subframe(s) out of 'NumSFs' has discovery resources<br>OR<br>   NumNonDiscoverySF;<br>     An 'offset' can also be added as additional parameter here. It is offset from beginning of discovery resource cycle and first subframe indicated by NumNonDiscoverySF or DiscoveryNonDiscoverySF<br>6) Discovery Resources<br>   a. For each of the subframe having discovery resources indicate<br>     i. Indicate TX discovery resources (i.e. PRBs)<br>     ii. Indicate RX Discovery resources (i.e. PRBs)<br>   OR<br>   b. For each of the subframe having discovery resources<br>     i. Indicate the Type 1 discovery resources (i.e. PRBs):<br>     ii. Indicate the Type 2 discovery resources (i.e. PRBs);<br>   Note: Non discovery subframes 'are determined based on parameter NumNonDiscoverySF or DiscoveryNonDiscoverySF<br>Note: Every subframe may have Type 1 and/or Type 2 discovery resources<br>Note: TX Resource Pool = Type 1 Resource Pool:<br>Note: RX Resource Pool = Type 1 Resource Pool + Type 2 Resource Pool; |

TABLE 3

| Options | Parameters of Discovery Resource Configuration |
|---|---|
| Option 4 | 1) DiscoveryResourceCycle;<br>2) DiscoveryResourceCycleOffset<br>3) ResourceAllocationSupportedTypes (Type 1 and/or Type 2)<br>4) RadioFrameNumber: Radio frame number(s) in discovery resource cycle which has discovery resources<br>   a. SFNum: Subframe numbers(for each radio frame number indicated above) which has discovery resources<br>   Note: In alternate method only subframe number may be indicated wherein subframes are logically numbered sequentially from beginning of discovery resource cycle.<br>5) Discovery Resources<br>   c. For each of the subframe (indicated by RadioFrameNumber and SFNum) having discovery resources indicate<br>     i. Indicate TX discovery resources (i.e. PRBs)<br>     ii. Indicate RX Discovery resources (i.e. PRBs)<br>   OR<br>   d. For each of the subframe having discovery resources<br>     i. Indicate the Type 1 discovery resources (i.e. PRBs):<br>     ii. Indicate the Type 2 discovery resources (i.e. PRBs):<br>     Note: if a subframe has only one type of PRBS and all PRBs for discovery then just indicate type of resource in the subframe. PRBs are not indicated. |

TABLE 4

| Options | Parameters of Discovery Resource Configuration. |
|---|---|
| Option 5 | 1) DiscoveryResourceCycle;<br>2) DiscoveryResourceCycleOffset<br>3) ResourceAllocationSupportedTypes (Type 1 and/or Type 2)<br>4) Type 1 Resource Pool:<br>    a. Offset (this can be in number of subframes of frames. Alternately this can he starting radio frame number and/or subframe number)<br>    b. NumType1SF; (These many subframes are there after/from an 'offset' from beginning of discovery resource cycle.)<br>    c. Discovery Resources in each discovery subframe amongst the 'NumType1SF' subframes;<br>    d. Bitmap to indicate discovery and non-discovery subframe in NumType1SF<br>5) Type 2 Resource Pool:<br>    a. Offset (this can be in number of subframes of frames. Alternately this can be starting radio frame number and/or subframe number)<br>    b. NumType2SF; (These many subframes are there after an 'offset' from, beginning of discovery resource cycle.)<br>    c. Discovery Resources in each discovery subframe amongst the 'NumType2SF' subframes<br>    d. Bitmap to indicate discovery and non-discovery subframe in NumType1SF<br>Note: TX Resource Pool = Type 1 Resource Pool;<br>Note: RX Resource Pool = Type 1 Resource Pool + Type 2 Resource Pool; |

TABLE 5

| Options | Parameters of Discovery Resource Configuration |
|---|---|
| Option 6 | 1) DiscoveryResourceCycle;<br>2) DiscoveryResourceCycleOffset<br>3) ResourceAllocationSupportedTypes (Type 1 and/or Type 2)<br>4) Type 1 Resource Pool:<br>    a. RadioFrameNumbers: Radio frame number(s) in discovery resource cycle which has discovery resources<br>        i. SFNums: Subframe numbers(for each radio frame number indicated above) which has discovery resources<br>5) Type 2 Resource Pool:<br>    a. RadioFrameNumbers: Radio frame number(s) in discovery resource cycle which has discovery resources<br>        i. SFNums: Subframe numbers(for each radio frame number indicated above) which has discovery resources<br>Note: TX Resource Pool = Type 1 Resource Pool;<br>Note: RX Resource Pool = Type 1 Resource Pool + Type 2, Resource Pool; |

Figure 15:
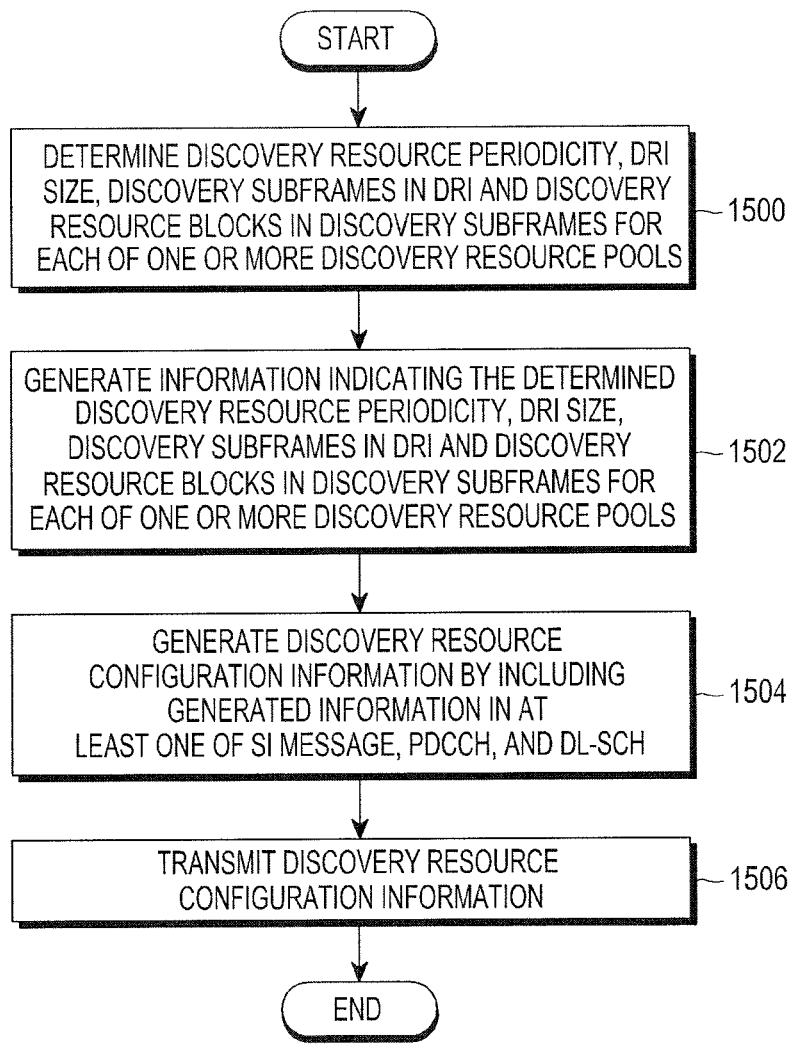
FIG. 15 is a flowchart illustrating an operation of a BS according to various embodiments of the present disclosure.

FIG. 15 is a flowchart illustrating an operation of a BS according to an embodiment of the present disclosure.

Referring to FIG. 15, the BS determines discovery resource periodicity, a DRI size, discovery subframes in a DRI and discovery resource blocks in discovery subframes for each of the one or more discovery resource pools in operation 1500 and generates information indicating the determined discovery resource periodicity, DRI size, the determined discovery subframes in the DRI and discovery resource blocks in discovery subframes for each of the one or more discovery resource pools in operation 1502.

In operation 1504, the BS generates discovery resource configuration information by including the generated information in at least one of an SI message, a PDCCH, and a DL-SCH. The BS then transmits the generated discovery resource configuration information in operation 1506.

Figure 16:
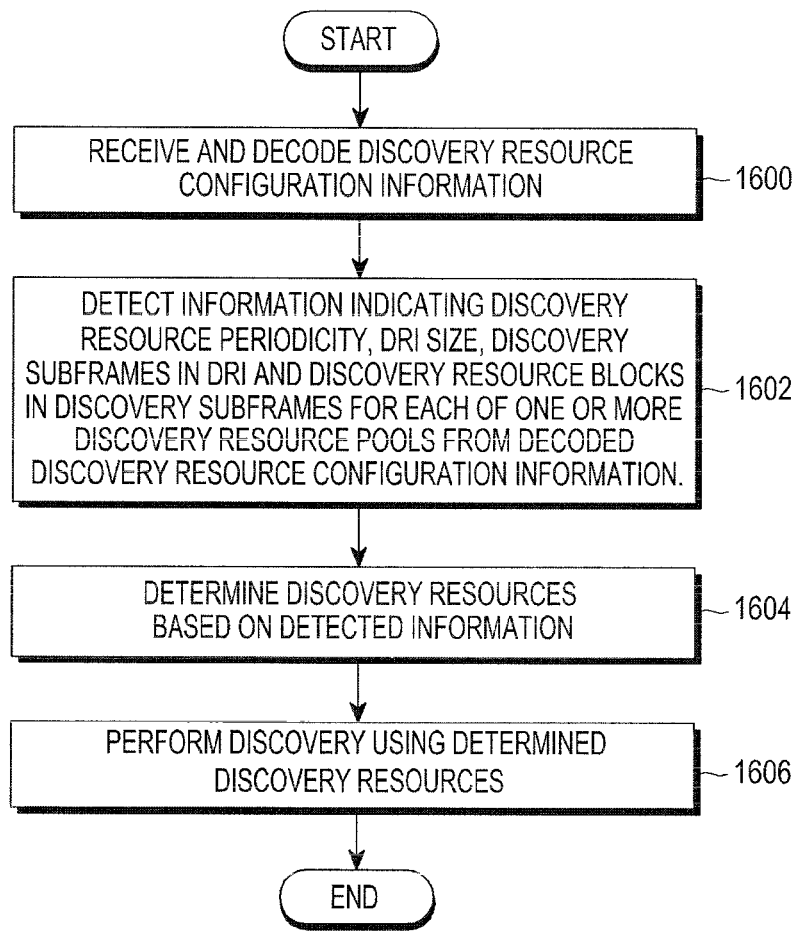
FIG. 16 is a flowchart illustrating an operation of a UE according to various embodiments of the present disclosure.

FIG. 16 is a flowchart illustrating an operation of a UE according to an embodiment of the present disclosure.

Referring to FIG. 16, the UE receives discovery resource configuration information from a BS and decodes the received discovery resource configuration information in operation 1600. In operation 1602, the UE detects information indicating discovery resource periodicity, a DRI size, discovery subframes in a DRI and discovery resource blocks in discovery subframes for each of the one or more discovery resource pools from the decoded discovery resource configuration information.

The UE determines discovery resources based on the detected information in operation 1604 and performs discovery using the detected resources in operation 1606.

Figure 17:
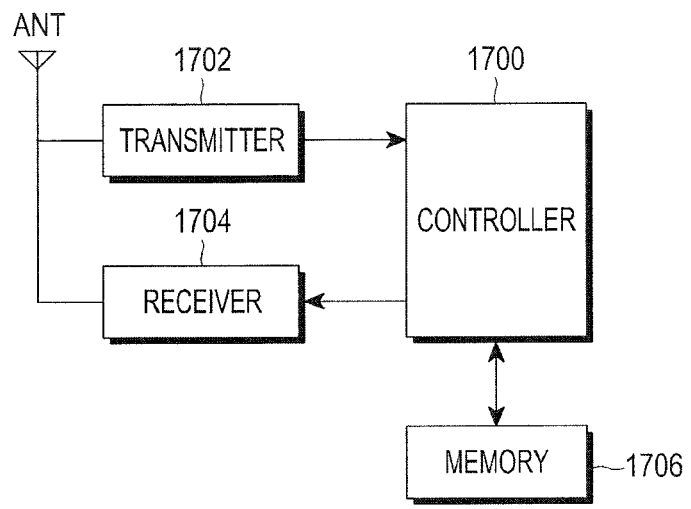
FIG. 17 is a block diagram of a BS according to various embodiments of the present disclosure.

FIG. 17 is a block diagram of a BS according to an embodiment of the present disclosure.

Referring to FIG. 17, the BS includes a controller 1700, a transmitter 1702, a receiver 1704, and a memory 1706. The controller 1700 controls the transmitter 1702, the receiver 1704, and the memory 1706, and performs BS operations according to the foregoing embodiments of the present disclosure. The transmitter 1702 performs a transmission operation such as transmission of discovery resource configuration information to a UE. The receiver 1704 receives data and messages from the UE. The memory 1706 stores various types of information that are generated by a BS operation or that are required.

Figure 18:
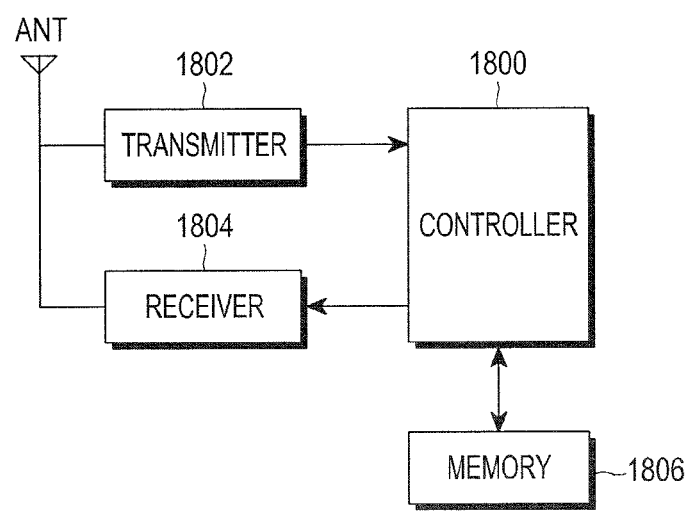
FIG. 18 is a block diagram of a UE according to various embodiments of the present disclosure.

FIG. 18 is a block diagram of a UE according to an embodiment of the present disclosure.

Referring to FIG. 18, the UE includes a controller 1800, a transmitter 1802, a receiver 1804, and a memory 1806. The controller 1800 controls the transmitter 1802, the receiver 1804, and the memory 1806, and performs UE operations according to the foregoing embodiments of the present disclosure. The transmitter 1802 performs a transmission operation to a BS and the receiver 1804 performs a reception operation such as reception of discovery resource configuration information from the BS. The memory 1806 stores various types of information that are generated by a UE operation or that are required.

The proposed method and apparatus for transmitting and receiving resource allocation information in a wireless communication system may be implemented as computer-readable code in a computer-readable recording medium. The computer-readable recording medium may include any kind of recording device storing computer-readable data. Examples of the recording medium may include read only memory (ROM), random access memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, since resources for D2D discovery are efficiently configured, the D2D discovery can be performed without affecting communication of legacy UEs and a UL HARQ operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a base station (BS) in a communication system, the method comprising:
   identifying a discovery resource interval (DRI) and a number of discovery subframes in the DRI;
   generating discovery resource configuration information indicating resources used for discovery, the discovery resource configuration information including information indicating the DRI, the number of discovery subframes in the DRI, subframe bitmap information, repetition information, and physical resource block (PRB) information; and
   transmitting the discovery resource configuration information,
   wherein the DRI indicates a duration for allocating of the resources,
   wherein the subframe bitmap information indicates at least one of the discovery subframes which is used for the discovery,
   wherein the repetition information indicating a number of times a bitmap occurs within the duration for allocating of the resources,
   wherein the PRB information is related to a PRB on a subframe for the discovery in the duration for the allocating of the resources, and includes a PRB start index and a PRB end index, and
   wherein the discovery resource configuration information is transmitted in a downlink shared channel (DL-SCH).

2. The method of claim 1, wherein the discovery resource configuration information indicates a pool of resources for discovery.

3. The method of claim 1, wherein the discovery resource configuration information further includes information indicating a set of time/frequency resources used for discovery.

4. The method of claim 1, wherein the subframe bitmap information relates to a bitmap of size 'N' bits, and each bit of the bitmap corresponds to a subframe.

5. The method of claim 1,
   wherein the discovery resource configuration information further includes a discovery resource periodicity, and
   wherein the discovery is device to device (D2D) discovery.

6. A method of a user equipment (UE) in a communication system, the method comprising:
   receiving discovery resource configuration information indicating resources used for discovery;
   identifying information indicating a discovery resource interval (DRI), a number of discovery subframes in the DRI, subframe bitmap information, repetition information, and physical resource block (PRB) information from the discovery resource configuration information; and
   performing discovery based on the identified information,
   wherein the DRI indicates a duration for allocating of the resources,
   wherein the subframe bitmap information indicates at least one of the discovery subframes which is used for the discovery,
   wherein the repetition information indicating a number of times a bitmap occurs within the duration for allocating of the resources,
   wherein the PRB information is related to a PRB on a subframe for the discovery in the duration for the allocating of the resources, and includes a PRB start index and a PRB end index, and
   wherein the discovery resource configuration information is received in a downlink shared channel (DL-SCH).

7. The method of claim 6, wherein the information indicates a pool of resources for discovery.

8. The method of claim 6, wherein the information further includes information indicates a set of time/frequency resources used for discovery.

9. The method of claim 6, wherein the subframe bitmap information relates to a bitmap of size 'N' bits, and each bit of the bitmap corresponds to a subframe.

10. The method of claim 6,
    wherein the discovery resource configuration information further includes a discovery resource periodicity, and
    wherein the discovery is device to device (D2D) discovery.

11. A base station (BS) in a communication system, the BS comprising:
    at least one processor configured to:
    identify a discovery resource interval (DRI) and a number of discovery subframes in the DRI;
    generate discovery resource configuration information indicating resources used for discovery, the discovery resource configuration information including information indicating the DRI, the number of discovery subframes in the DRI, subframe bitmap information, repetition information, and physical resource block (PRB) information; and
    a transceiver configured to transmit the discovery resource configuration information,
    wherein the DRI indicates a duration for allocating of the resources,
    wherein the subframe bitmap information indicates at least one of the discovery subframes which is used for the discovery,
    wherein the repetition information indicating a number of times a bitmap occurs within the duration for allocating of the resources,
    wherein the PRB information is related to a PRB on a subframe for the discovery in the duration for the allocating of the resources, and includes a PRB start index and a PRB end index, and
    wherein the discovery resource configuration information is transmitted in a downlink shared channel (DL-SCH).

12. The BS of claim 11, wherein the discovery resource configuration information indicates a pool of resources for discovery.

13. The BS of claim 11, wherein the discovery resource configuration information further includes information indicating a set of time/frequency resources used for discovery.

14. The BS of claim 11, wherein the subframe bitmap information relates to a bitmap of size 'N' bits, and each bit of the bitmap corresponds to a subframe.

15. A user equipment (UE) in a communication system, the UE comprising:
- a transceiver configured to receive discovery resource configuration information indicating resources used for discovery; and
- at least one processor configured to:
  - identify information indicating a discovery resource interval (DRI), a number of discovery subframes in the DRI, subframe bitmap information, repetition information, and physical resource block (PRB) information from the discovery resource configuration information, and
  - perform discovery based on the identified information, wherein the DRI indicates a duration for allocating of the resources, wherein the subframe bitmap information indicates at least one of the discovery subframes which is used for the discovery, wherein the repetition information indicating a number of times a bitmap occurs within the duration for allocating of the resources, wherein the PRB information is related to a PRB on a subframe for the discovery in the duration for the allocating of the resources, and includes a PRB start index and a PRB end index, and wherein the discovery resource configuration information is received in a downlink shared channel (DL-SCH).

16. The UE of claim 15, wherein the information indicates a pool of resources for discovery.

17. The UE of claim 15, wherein the information further includes information indicates a set of time/frequency resources used for discovery.

18. The UE of claim 15, wherein the subframe bitmap information relates to a bitmap of size 'N' bits, and each bit of the bitmap corresponds to a subframe.

* * * * *